United States Patent
Baker, Jr.

(10) Patent No.: US 11,468,757 B2
(45) Date of Patent: Oct. 11, 2022

(54) SYSTEMS AND METHODS FOR FACILITATING SUPERVISION OF INDIVIDUALS BASED ON GEOFENCING

(71) Applicant: Gary Thomas Baker, Jr., Houston, TX (US)

(72) Inventor: Gary Thomas Baker, Jr., Houston, TX (US)

( * ) Notice: Subject to any disclaimer, the term of this patent is extended or adjusted under 35 U.S.C. 154(b) by 61 days.

(21) Appl. No.: 16/810,703

(22) Filed: Mar. 5, 2020

(65) Prior Publication Data
US 2020/0286355 A1 Sep. 10, 2020

Related U.S. Application Data

(60) Provisional application No. 62/814,097, filed on Mar. 5, 2019.

(51) Int. Cl.
*G08B 21/02* (2006.01)
*H04W 12/00* (2021.01)

(52) U.S. Cl.
CPC ..... *G08B 21/0261* (2013.01); *G08B 21/0208* (2013.01); *G08B 21/0255* (2013.01); *H04W 12/009* (2019.01)

(58) Field of Classification Search
None
See application file for complete search history.

(56) References Cited

U.S. PATENT DOCUMENTS

| | | | | |
|---|---|---|---|---|
| 6,265,974 B1* | 7/2001 | D'Angelo | ........ | G08B 21/0247 340/568.1 |
| 7,881,733 B2* | 2/2011 | Staton | ........ | G08C 17/00 455/420 |
| 8,761,803 B2* | 6/2014 | Frank | ........ | H04L 63/10 455/414.3 |
| 8,781,457 B2* | 7/2014 | Randazzo | ........ | H04L 67/535 455/418 |
| 2007/0252690 A1* | 11/2007 | Pate | ........ | G08B 25/016 340/539.13 |
| 2011/0106561 A1* | 5/2011 | Eaton, Jr. | ........ | G16H 80/00 705/2 |
| 2011/0227730 A1* | 9/2011 | Stevenson | ........ | H04M 11/04 340/540 |
| 2011/0244837 A1* | 10/2011 | Murata | ........ | H04W 4/50 455/414.1 |

(Continued)

*Primary Examiner* — Muhammad Adnan

(57) ABSTRACT

Disclosed herein is a method for facilitating supervision of individuals based on geofencing. Accordingly, the method may include receiving, using a communication device, a parameter from a supervisor device associated with a supervisor and a geographical location from the supervisor device. Further, the method may include analyzing, using a processing device, the geographical location based on a security parameter and generating a geofence corresponding to a geographical area based on the analyzing. Further, the method may include receiving, using the communication device, supervisee data associated with a supervisee from a supervisee device. Further, the method may include analyzing, using the processing device, the supervisee data based on the geofence and generating a supervision notification based on the analyzing of the supervisee data. Further, the method may include transmitting, using the communication device, the supervision notification to the supervisor device.

18 Claims, 43 Drawing Sheets

(56) References Cited

U.S. PATENT DOCUMENTS

| | | | |
|---|---|---|---|
| 2012/0237908 A1* | 9/2012 | Fitzgerald | H04W 4/029 |
| | | | 434/236 |
| 2013/0143527 A1* | 6/2013 | Randazzo | H04M 1/72457 |
| | | | 455/411 |
| 2016/0005287 A1* | 1/2016 | Yamaoka | G08B 21/0247 |
| | | | 340/539.13 |
| 2017/0084151 A1* | 3/2017 | Beaty | G08B 21/0227 |
| 2017/0149795 A1* | 5/2017 | Day, II | H04L 67/535 |
| 2018/0068544 A1* | 3/2018 | Caperell | H04W 4/027 |
| 2019/0130722 A1* | 5/2019 | Thalhofer | A44C 5/2071 |
| 2019/0252054 A1* | 8/2019 | Dirani | G16H 40/63 |
| 2019/0279481 A1* | 9/2019 | Silberschatz | G08B 21/0208 |
| 2019/0285416 A1* | 9/2019 | Silva | G08B 25/016 |

\* cited by examiner

SYSTEMS AND METHODS FOR FACILITATING SUPERVISION OF INDIVIDUALS BASED ON GEOFENCING

TECHNICAL FIELD

Generally, the present disclosure relates to the field of data processing. More specifically, the present disclosure relates to systems and methods for facilitating supervision of individuals based on geofencing.

BACKGROUND

Geofence is a virtual perimeter for a real-world geographical area that is widely used in location-based services. In other words, geofence can be predefined boundaries (such as school zones and/or neighborhood boundaries) that allows an individual to trigger an alert to multiple users when the individual may enter and/or exit the geofence. For instance, Geofencing is used with child location services that can notify parents if a child leaves a designated area.

However, conventional geofencing applications do not allow easy access for a user to create the geofence. For instance, the conventional geofencing applications do not allow the user to create the geofence based on factors such as criminal activities, crowd density, etc. of the neighborhood. Further, the conventional geofencing applications may not allow an individual to seamlessly communicate (such as chat and/or video call) directly with multiple organizations (such as emergency services, parents, etc.).

Therefore, there is a need for improved systems and methods for facilitating supervision of individuals based on geofencing that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating supervision of individuals based on geofencing, in accordance with some embodiments. Accordingly, the method may include a step of receiving, using a communication device, at least one parameter from at least one supervisor device associated with at least one supervisor. Further, the method may include a step of receiving, using the communication device, a geographical location from the at least one supervisor device. Further, the method may include a step of analyzing, using a processing device, the geographical location based on the at least one security parameter. Further, the method may include a step of generating, using the processing device, a geofence corresponding to a geographical area based on the analyzing. Further, the method may include a step of receiving, using the communication device, at least one supervisee data associated with a supervisee from at least one supervisee device. Further, the method may include a step of analyzing, using the processing device, the at least one supervisee data based on the geofence. Further, the method may include a step of generating, using the processing device, a supervision notification based on the analyzing of the at least one supervisee data. Further, the method may include a step of transmitting, using the communication device, the supervision notification to the at least one supervisor device. Further, the method may include a step of storing, using a storage device, the at least one supervisee data and the supervision notification.

Further disclosed herein is a system for facilitating supervision of individuals based on geofencing, in accordance with some embodiments. Accordingly, the system may include a communication device, a processing device, and a storage device. Further, the communication device may be configured for receiving at least one parameter from at least one supervisor device associated with at least one supervisor. Further, the communication device may be configured for receiving a geographical location from the at least one supervisor device. Further, the communication device may be configured for receiving at least one supervisee data associated with a supervisee from at least one supervisee device. Further, the communication device may be configured for transmitting a supervision notification to the at least one supervisor device. Further, the processing device may be configured for analyzing the geographical location based on the at least one security parameter. Further, the processing device may be configured for generating a geofence corresponding to a geographical area based on the analyzing. Further, the processing device may be configured for analyzing the at least one supervisee data based on the geofence. Further, the processing device may be configured for generating the supervision notification based on the analyzing of the at least one supervisee data. Further, the storage device may be configured for storing the at least one supervisee data and the supervision notification.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
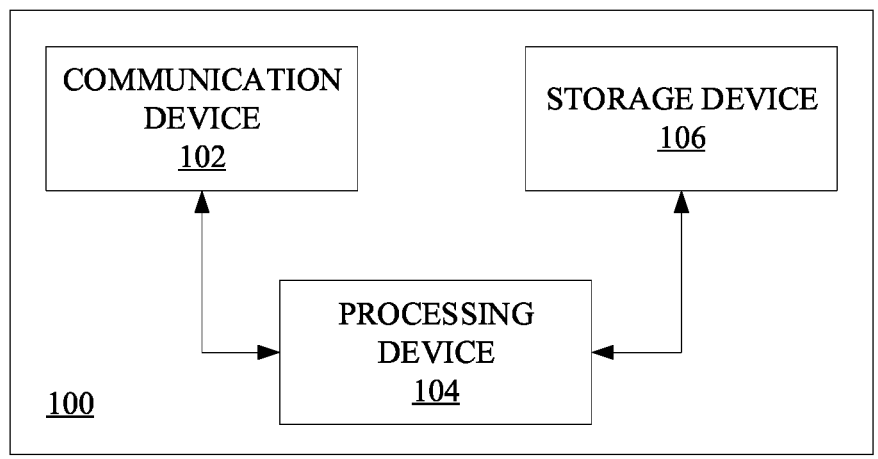
FIG. 1 is a block diagram of a system for facilitating supervision of individuals based on geofencing, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating supervision of individuals based on geofencing, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on.

Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

OVERVIEW

The present disclosure describes systems and methods for facilitating supervision of individuals based on geofencing. Further, the present disclosure, in an instance, may include a system and/or a method to allow a user (organization) to map and/or geofence a facility (such as a school). Anything inside the geofencing may automatically route to properties dispatch. Further, the supervisor device, in an instance, may be any GPS enabled device that may be operated by a supervisor. Further, the supervisor, in an instance, may include an individual and/or organization that may wish to supervise other users (such as children). Further, the supervised user device, in an instance, may include a GPS enabled device which may be operated by a supervised user. Further, the supervised user, in an instance, may include an individual that may need to be supervised by the supervisor. For instance, the supervised user may include a child going to a school that may need to be supervised by the parents with regard to a location associated with the child.

Further, the disclosed system and method may allow an organization to create an account, create a geofence, store in a database, access account. Further, if a user with a mobile device has an incident, the user may click a dispatch button.

Further, the user may be provided with features such as Shake button (click-override), Re-configured buttons home standby and home on record, "Hide" (such as lock-out, pass-code initiated enter passcode), Quick-share {such as quick share, notification, select text message to send (sends link to non-registered users), SMS email, hyperlink ready (video stream), send to an application (application notification email device)}

Further, the user may be provided with a feature that may include switching from screen to a video stream view to a GPS view. Further, the disclosed system may be configured to access incidents ongoing and/or history through cloud storage. Further, the cloud storage, in an instance, may be peer to peer storage which refers to mobile device encrypted storage. Further, the peer to peer storage, in an instance, may allow the saved data to be saved on multiple user devices and/or to be retrieved from those devices when requested. Further, the disclosed system may be configured to provide peer to peer streaming where the data may pass through multiple devices instead of a storage cloud.

Further, the feature may allow sharing selected incident through "subscribed contacts." For instance, the subscribed contacts may include (but not limited to) ABC news, subscribed user, organizations, personal contacts, etc.

Further, the disclosed system may allow Geofencing. For instance, add one or more locations, multiple points, checkpoints, etc. in order to get notifications from positional and timing anomalies—alert; notification (made it, diverted, normal route, auto check-in), and/or schedule tracking of each "leg" etc.

Further, the disclosed system may include drone deployment. For instance, take data from location incident, tracking. Further, an organization drone may be deployed to a location in order to monitor the incident.

Further, the disclosed system may include a Chirp Responder Home that may include messaging services, CB radio emulations (such as real-time messages), PTT, one-person talking to same, and time-dependent duration talk, etc.

Further, the disclosed system may include facial and object recognition that may be configured to scan and identify (such as object recognition, identifying a gun), and/or automatically runs a trigger to scan faces to qualify the gun carrier—if NOT qualified, triggers an event such as (but not limited to) a notification automatically to be received by a dispatch system. Further, in an instance, the disclosed system may be configured to scan face (facial scan) and match the scanned face with data associated with a database to identify zone-based violation (such as a pedophile near a school) once identified automated trigger. Further, the disclosed method may include an autonomous process such as capturing frame, running a scan, redundancy override, etc. For instance, the disclosed system may be configured to identify the object and/or face by using facial and trained object detection data. Further, once a face and/or object may be identified, the disclosed system may be configured to capture a frame. Further, the disclosed system, in an instance, may run the redundancy scan before scanning the database (and/or image database).

Further, the user, in an instance, may receive an alert when a person may be lost. Accordingly, that user may turn on a device for scanning and/or capturing Bluetooth (wireless network) or NFC or any type of retrievable device creating a code for that device to trigger that lost person alert within geofencing proximity. Further, when the user device may identify the device code of the lost person, the user device may trigger a notification to responsible parties and/or may dispatch the location and timestamp along with user information for assist request and the user with the lost person's data for assistance.

Further, an augmented reality view may be presented to the user through the user device. Further, the user device may track the location of individuals to show where they (the individuals) are in the facility (chirp integrated).

Further, the user device (such as landlines and/or office phones) may capture location when a person may call from the phone to automatically show where the person may be present. Further, the disclosed system may include Identifier-report (for location/tracking purposes).

Further, the disclosed system may include a feature such as Video Sourcing, which may allow cameras at a user's house to allocate surveillance in a case when an emergency service such as police may need video data (for instance to follow a criminal during a chase). For instance, a user may make a request to use the camera and the user may be authorized to access the camera for a limited time (timer orientated). Further, a notification that the camera may no longer be used may also be shared using crowd-sourcing video. Tap into these cameras. Further, users may de-authorize cameras upon choice.

Further, organizations may create a geofence and when an incident may be executed, Samscloud (the application) may check a database and automatically route the incident. For instance, anyone with the application may trigger an event that directly connects them to any organization, property, area with a geofence. Further, the application may be triggered by (for instance) clicking a button, swiping a component, shaking the phone, speech recognition, etc.

Further, the disclosed system, in an instance, may facilitate object and/or facial recognition. Accordingly, the disclosed system may be trained to identify a particular object (gun/weapon) such that when the particular object may be identified, the system may be configured to run a script to check face to verify if the face may be authorized or not. Further, if the face may not be authorized, then the system may automatically run an emergency scenario alert. Further, using just the screen when a face is identified, the system may reduce the need to record the video or take pictures and/or may reduce the need to process entire videos.

Further, the user may point and when a face may be identified (results may be served to the user). Further, the user may shake the device to move through the emergency phases. Further, the user may be allowed to use the augmented reality view to locate victims during an emergency with a tap of the device. Further, the Chirp may allow the user to (with a click a button) communicate with one or more (similar to CB) users. Further, the users may have a group and/or one on one conversation without dialing just click and the system may connect everyone in the group to hear the conversation.

Further, the disclosed system may allow a user (or organization) to map the school, geofence, anything inside the geofencing automatically routes to that properties dispatch. Further, an organization may be prompted to create an account. Further, the organization may create a geofence. Further, the organization may access account using a database. Further, the user with a mobile device has an incident. Further, the user may click dispatch button.

Referring now to figures, FIG. 1 is a block diagram of a system 100 for facilitating supervision of individuals based on geofencing, in accordance with some embodiments. Accordingly, the system 100 may include a communication device 102, a processing device 104, and a storage device 106.

Further, the communication device 102 may be configured for receiving at least one parameter from at least one supervisor device associated with at least one supervisor. Further, the communication device 102 may be configured for receiving a geographical location from the at least one supervisor device. Further, the communication device 102 may be configured for receiving at least one supervisee data associated with a supervisee from at least one supervisee device. Further, the at least one supervisee device may be disposed on the geographical area corresponding to the geofence. Further, the at least one supervisee device may include a wearable device. Further, the supervisee wears the wearable device. Further, the at least one supervisee device may be disposed on the geographical area corresponding to the geofence. Further, the communication device 102 may be configured for transmitting a supervision notification to the at least one supervisor device.

Further, the processing device 104 may be configured for analyzing the geographical location based on the at least one security parameter. Further, the processing device 104 may be configured for generating a geofence corresponding to a geographical area based on the analyzing. Further, the processing device 104 may be configured for analyzing the at least one supervisee data based on the geofence. Further, the processing device 104 may be configured for generating the supervision notification based on the analyzing of the at least one supervisee data.

Further, the storage device 106 may be configured for storing the at least one supervisee data and the supervision notification.

Further, in some embodiments, the communication device 102 may be further configured for receiving at least one location indication associated with the geographical area from the at least one supervisor device. Further, the processing device 104 may be further configured for identifying at least one location corresponding to the at least one location indication. Further, the processing device 104 may be further configured for analyzing the at least one supervisee data based on the at least one location. Further, the processing device 104 may be further configured for determining a location anomaly based on the analyzing of the at least one supervisee data based on the at least one location. Further, the generating of the supervision notification may be based on the determining.

Further, in some embodiments, the processing device 104 may be further configured for identifying the supervisee based on the analyzing of the at least one supervisee data. Further, the analyzing may include a facial recognition system. Further, the storage device 106 may be configured for retrieving supervisee profile data associated with the supervisee based on the identifying. Further, the generating of the supervision notification may be based on the retrieving.

Further, in some embodiments, the processing device 104 may be further configured for identifying at least one object associated with the supervisee based on the analyzing of the at least one supervisee data. Further, the analyzing may include IR scanning, X-ray scanning, etc. Further, the processing device 104 may be further configured for determining a lethality of the at least one object based on the identifying. Further, the generating of the supervision notification may be based on the determining.

Further, in some embodiments, the communication device 102 may be further configured for receiving at least one environment data associated the geographical area corresponding to the geofence. Further, the processing device 104 may be further configured for analyzing the at least one environment data. Further, the processing device 104 may be further configured for determining at least one threat based on the analyzing of the at least one environment data. Further, the generating of the supervisor notification may be based on the determining.

Further, in some embodiments, the storage device 106 may be further configured for retrieving a blueprint associated with the geographical area corresponding to the geofence. Further, the geographical area may include a facility such as a school, a hostel, etc. Further, the processing device 104 may be further configured for analyzing the blueprint and the at least one supervisee data. Further, the processing device 104 may be further configured for determining a location of the supervisee on the blueprint based on the analyzing of the blueprint and the at least one supervisee data. Further, the generating of the supervision data may be based on the determining.

Further, in some embodiments, the at least one supervisee device may include at least one sensor. Further, the at least one sensor may be configured for detecting at least one signal made by the supervisee. Further, the at least one signal may include a gesture signal, a sound signal, etc. Further, the at least one sensor may be configured for generating the at least one supervisee data based on the detecting. Further, the at least one sensor may include an IR sensor, an image sensor, etc.

Further, in some embodiments, the supervision notification may include at least one supervisee event. Further, the at least one supervisee event may be associated with at least one action. Further, the processing device 104 may be configured for determining the at least one action based on the supervision notification. Further, the processing device 104 may be configured for performing the at least one action based on the determining. Further, the at least one action may include an establishment of a communication session between the at least one supervisor device and the at least one supervisee device.

Further, in some embodiments, the geofence may be characterized by a geofence area corresponding to the geographical area. Further, the geofence may include a plurality of geofence grid boxes associated with the geofence area. Further, each geofence grid box may be characterized by a grid box geofence area of the geofence area. Further, the communication device 102 may be configured for receiving at least one grid parameter from the at least one supervisor device. Further, the processing device 104 may be configured for analyzing the at least one grid parameter. Further, the processing device 104 may be configured for determining the grid box geofence area based on the analyzing of the at least one grid parameter. Further, the processing device 104 may be configured for generating a number of geofence grid boxes based on the determining.

Further, in some embodiment, the supervisee may be associated with at least one near field communication (NFC) identification. Further, the communication device 102 may be configured for receiving at least one NFC indication corresponding to the at least NFC identification from the at least one supervisee device. Further, the processing device 104 may be configured for identifying the supervisee based on the at least one NFC indication. Further, the generating of the supervision notification may be based on the identifying.

Figure 2:
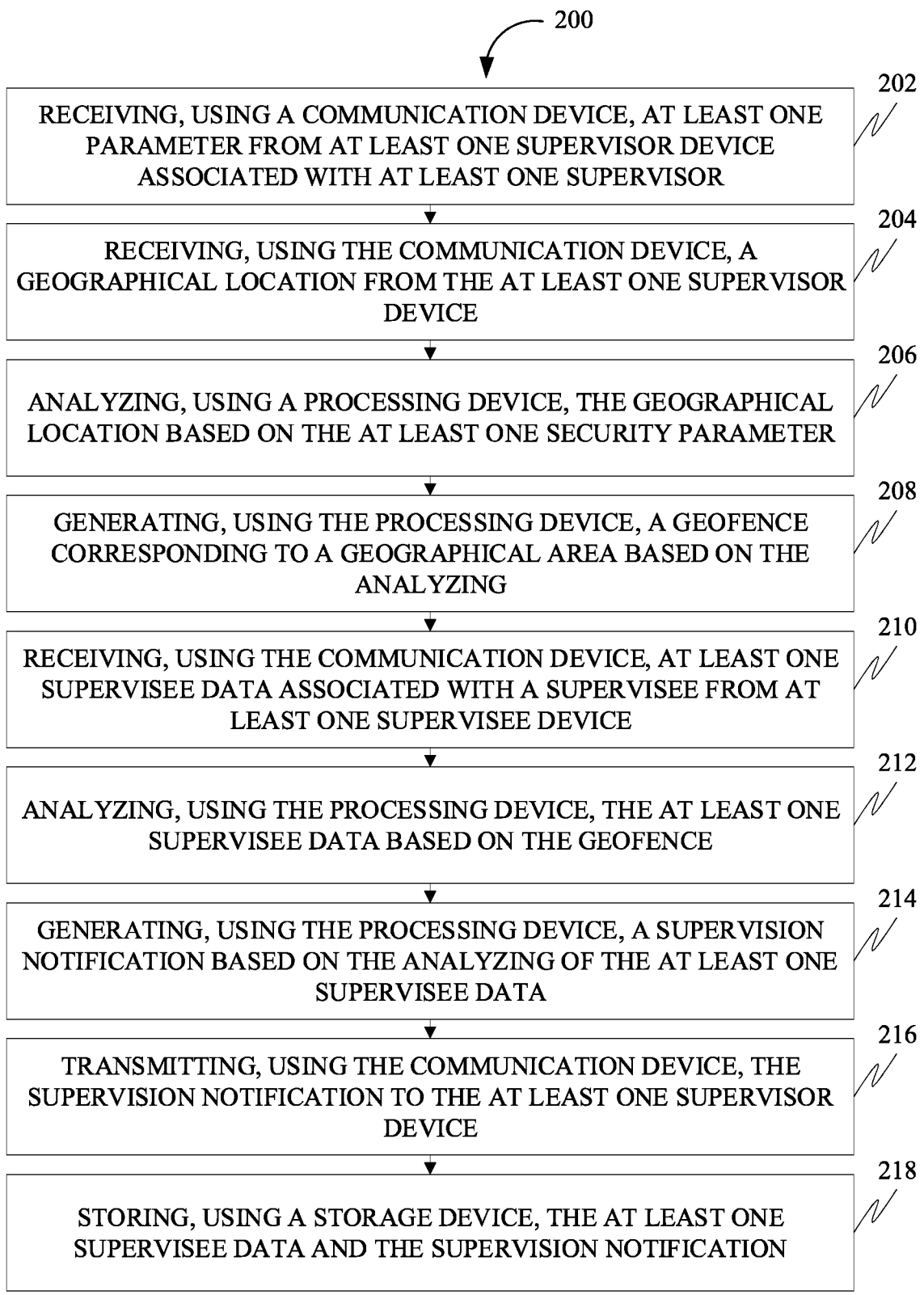
FIG. 2 is a flowchart of a method for facilitating supervision of individuals based on geofencing, in accordance with some embodiments.

FIG. 2 is a flowchart of a method 200 for facilitating supervision of individuals based on geofencing, in accordance with some embodiments. Accordingly, at 202, the method 200 may include a step of receiving, using a communication device, at least one parameter from at least one supervisor device associated with at least one supervisor.

Further, at 204, the method 200 may include a step of receiving, using the communication device, a geographical location from the at least one supervisor device.

Further, at 206, the method 200 may include a step of analyzing, using a processing device, the geographical location based on the at least one security parameter.

Further, at 208, the method 200 may include a step of generating, using the processing device, a geofence corresponding to a geographical area based on the analyzing.

Further, at 210, the method 200 may include a step of receiving, using the communication device, at least one supervisee data associated with a supervisee from at least one supervisee device.

Further, at 212, the method 200 may include a step of analyzing, using the processing device, the at least one supervisee data based on the geofence.

Further, at 214, the method 200 may include a step of generating, using the processing device, a supervision notification based on the analyzing of the at least one supervisee data.

Further, at 216, the method 200 may include a step of transmitting, using the communication device, the supervision notification to the at least one supervisor device.

Further, at 218, the method 200 may include a step of storing, using a storage device, the at least one supervisee data and the supervision notification.

Figure 3:
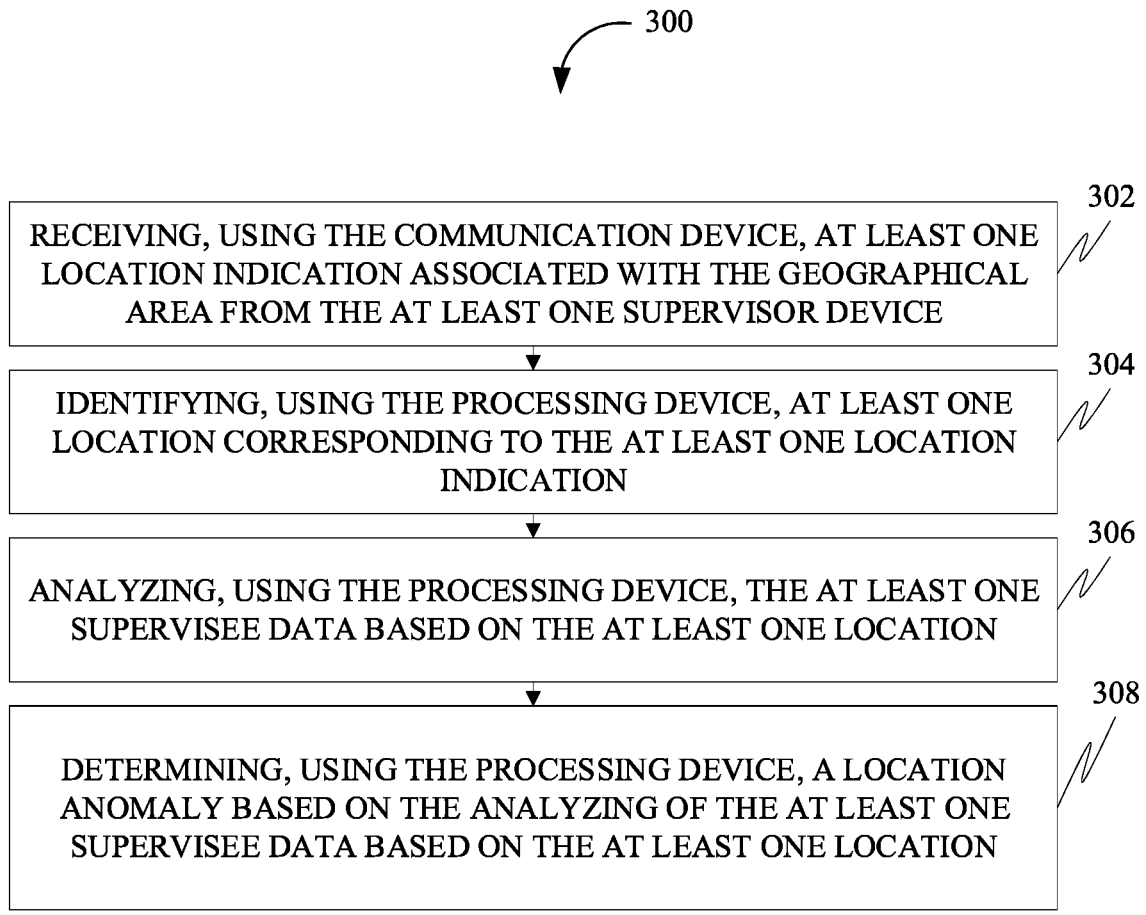
FIG. 3 is a flowchart of a method for facilitating determination of a location anomaly based on the geofencing, in accordance with some embodiments.

FIG. 3 is a flowchart of a method 300 for facilitating determination of a location anomaly based on the geofencing, in accordance with some embodiments. Accordingly, at 302, the method 300 may include a step of receiving, using the communication device, at least one location indication associated with the geographical area from the at least one supervisor device.

Further, at 304, the method 300 may include a step of identifying, using the processing device, at least one location corresponding to the at least one location indication.

Further, at 306, the method 300 may include a step of analyzing, using the processing device, the at least one supervisee data based on the at least one location.

Further, at 308, the method 300 may include a step of determining, using the processing device, a location anomaly based on the analyzing of the at least one supervisee data based on the at least one location. Further, the generating of the supervision notification may be based on the determining.

Figure 4:
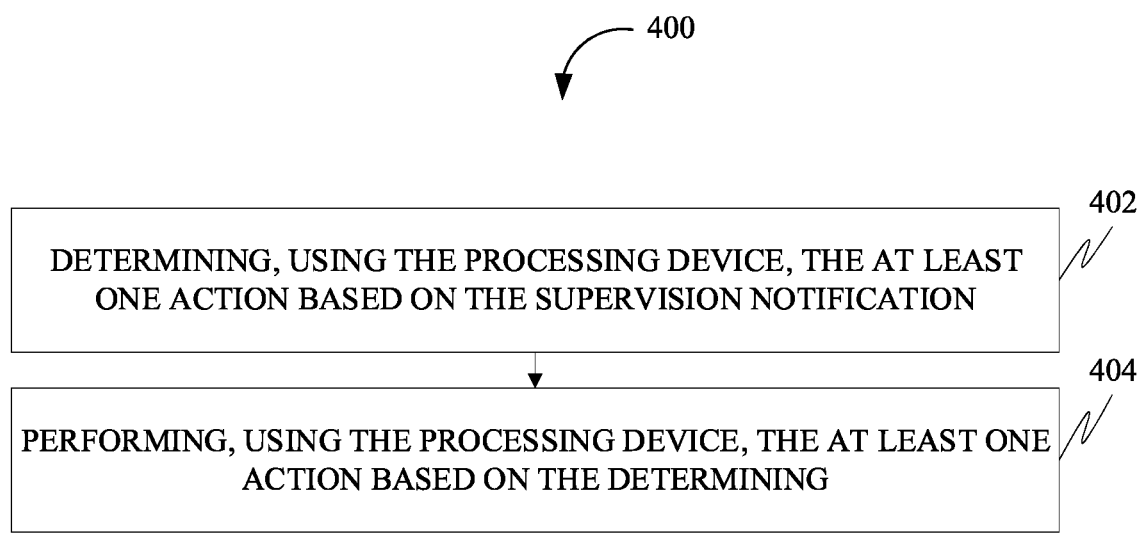
FIG. 4 is a flowchart of a method for facilitating performing of an action based on the geofencing, in accordance with some embodiments.

FIG. 4 is a flowchart of a method 400 for facilitating performing of an action based on the geofencing, in accordance with some embodiments. Accordingly, at 402, the method 400 may include a step of determining, using the processing device, the at least one action based on the supervision notification.

Further, at 404, the method 400 may include a step of performing, using the processing device, the at least one action based on the determining. Further, the at least one action may include an establishment of a communication session between the at least one supervisee device and the at least one supervisor device.

Figure 5:
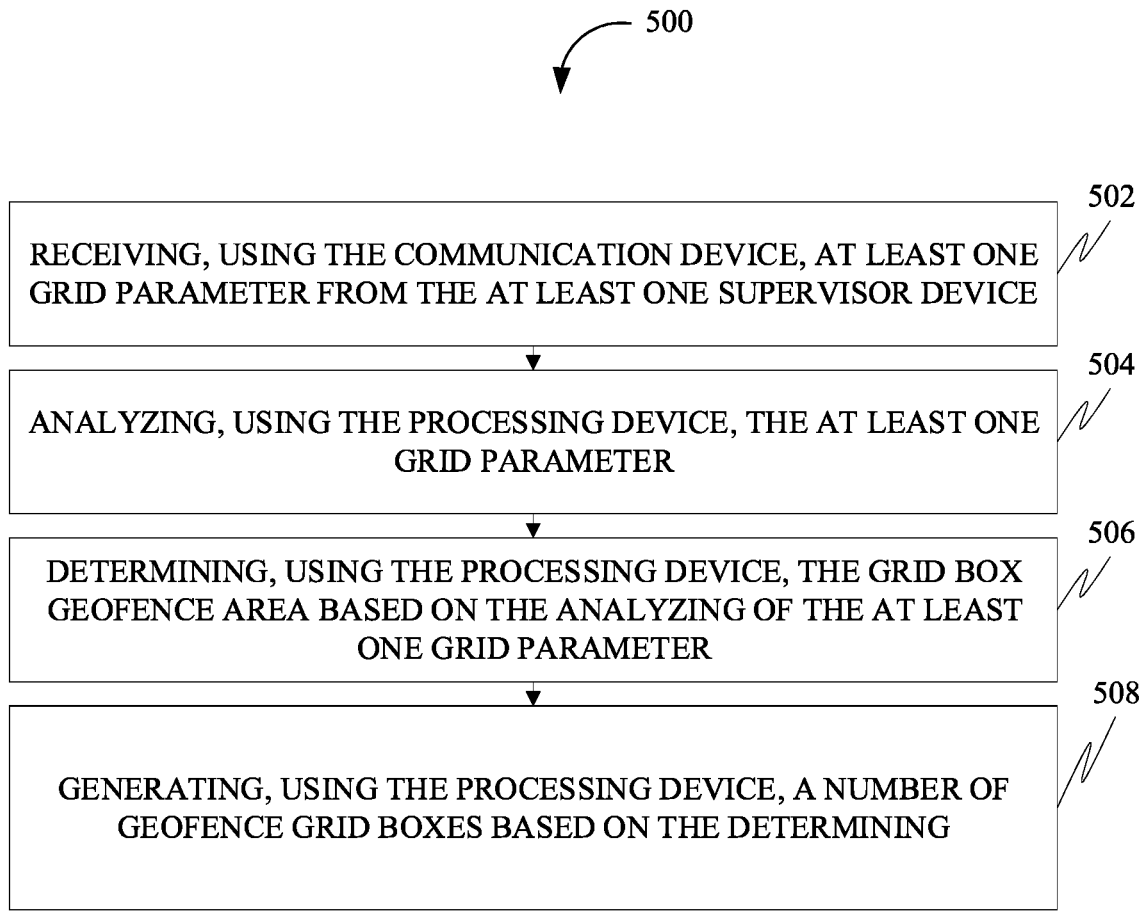
FIG. 5 is a flowchart of a method for facilitating generating a geofence grid based on the geofencing, in accordance with some embodiments.

FIG. 5 is a flowchart of a method 500 for facilitating generating a geofence grid based on the geofencing, in accordance with some embodiments. Accordingly, at 502, the method 500 may include a step of receiving, using the communication device, at least one grid parameter from the at least one supervisor device.

Further, at 504, the method 500 may include a step of analyzing, using the processing device, the at least one grid parameter.

Further, at 506, the method 500 may include a step of determining, using the processing device, the grid box geofence area based on the analyzing of the at least one grid parameter.

Further, at 508, the method 500 may include a step of generating, using the processing device, a number of geofence grid boxes based on the determining.

Figure 6:
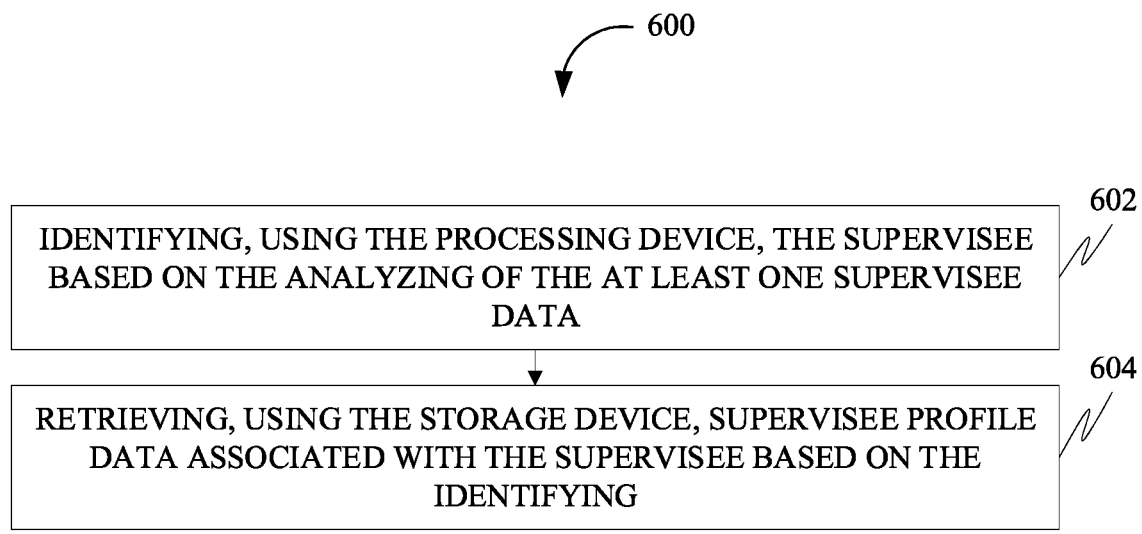
FIG. 6 is a flowchart of a method for facilitating identification of a supervisee based on the geofencing, in accordance with some embodiments.

FIG. 6 is a flowchart of a method 600 for facilitating identification of a supervisee based on the geofencing, in accordance with some embodiments. Accordingly, at 602, the method 600 may include a step of identifying, using the processing device, the supervisee based on the analyzing of the at least one supervisee data. Further, the analyzing may include a facial recognition system.

Further, at 604, the method 600 may include a step of retrieving, using the storage device, supervisee profile data associated with the supervisee based on the identifying. Further, the generating of the supervision notification may be based on the retrieving.

Figure 7:
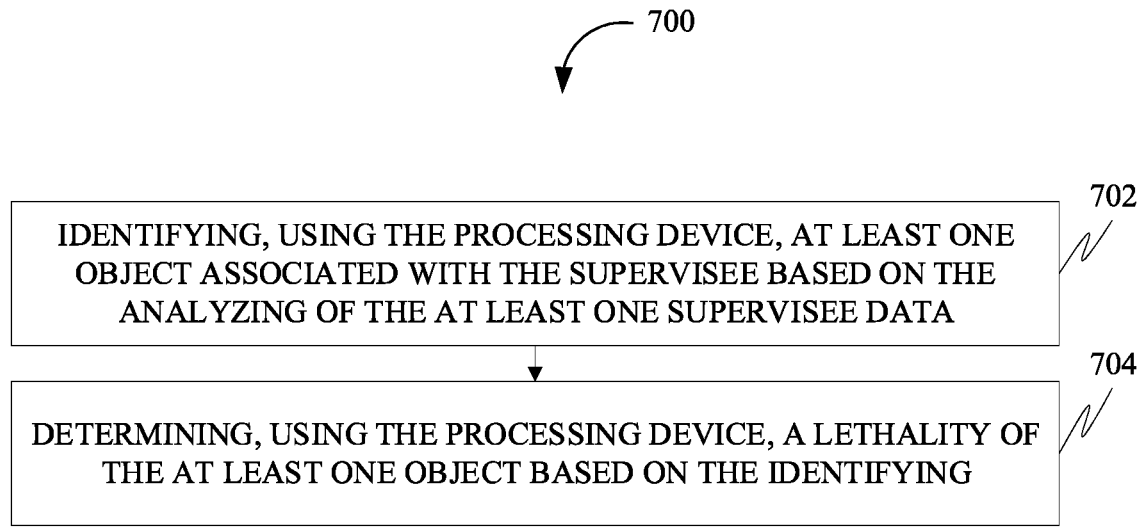
FIG. 7 is a flowchart of a method for facilitating determination of lethality of an object based on the geofencing, in accordance with some embodiments.

FIG. 7 is a flowchart of a method 700 for facilitating determination of lethality of an object based on the geofencing, in accordance with some embodiments. Accordingly, at 702, the method 700 may include a step of identifying, using the processing device, at least one object associated with the supervisee based on the analyzing of the at least one supervisee data. Further, the analyzing may include IR scanning, X-ray scanning, etc.

Further, at 704, the method 700 may include a step of determining, using the processing device, a lethality of the at least one object based on the identifying. Further, the generating of the supervision notification may be based on the determining.

Figure 8:
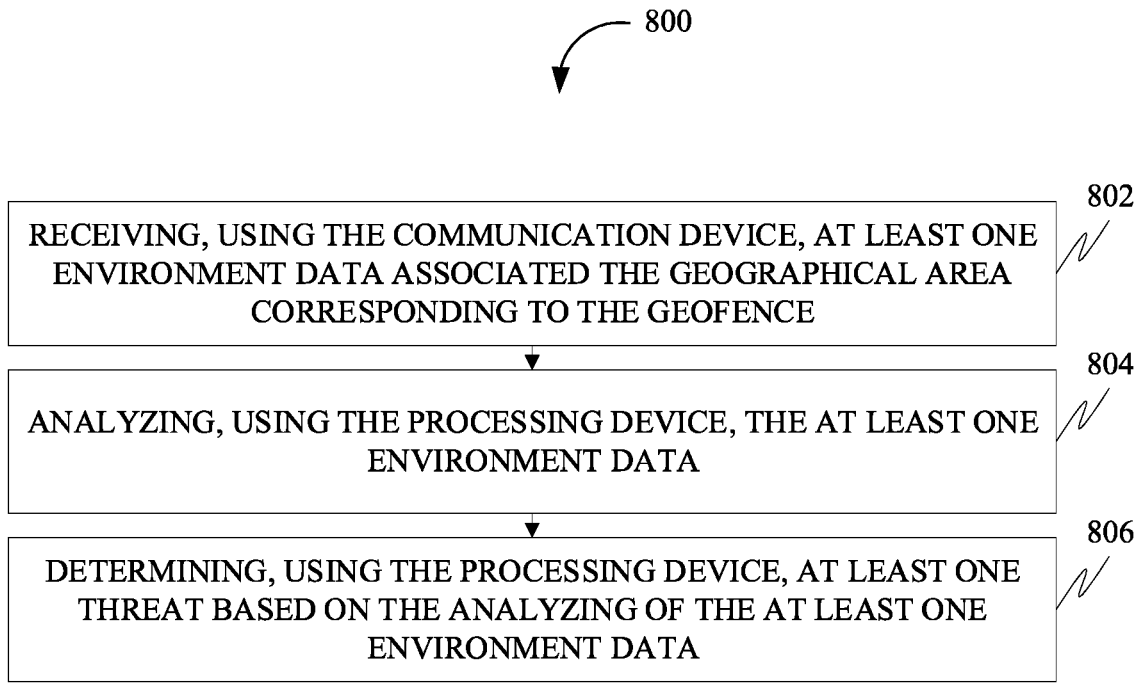
FIG. 8 is a flowchart of a method for facilitating determination of a threat in an environment of a supervisee based on the geofencing, in accordance with some embodiments.

FIG. 8 is a flowchart of a method 800 for facilitating determination of a threat in an environment of a supervisee based on the geofencing, in accordance with some embodiments.

Accordingly, at 802, the method 800 may include a step of receiving, using the communication device, at least one environment data associated the geographical area corresponding to the geofence.

Further, at 804, the method 800 may include a step of analyzing, using the processing device, the at least one environment data.

Further, at 806, the method 800 may include a step of determining, using the processing device, at least one threat based on the analyzing of the at least one environment data. Further, the generating of the supervisor notification may be based on the determining.

Figure 9:
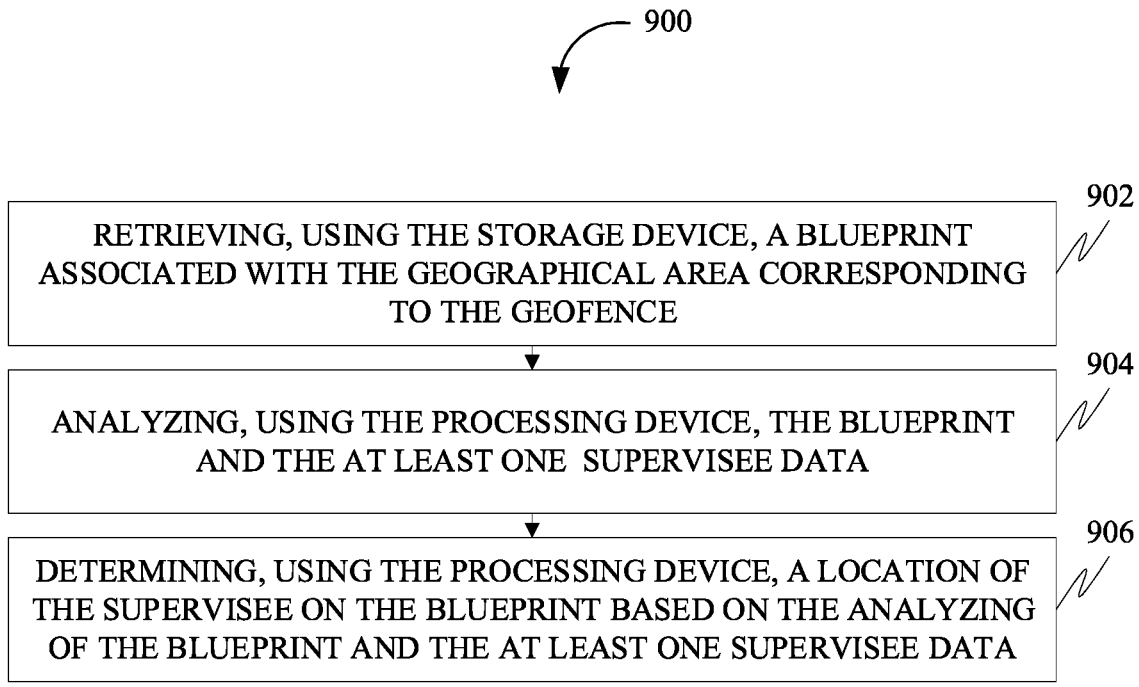
FIG. 9 is a flowchart of a method for facilitating determination of a specific location of a supervisee based on the geofencing, in accordance with some embodiments.

FIG. 9 is a flowchart of a method 900 for facilitating determination of a specific location of a supervisee based on the geofencing, in accordance with some embodiments. Accordingly, at 902, the method 900 may include a step of retrieving, using the storage device, a blueprint associated with the geographical area corresponding to the geofence. Further, the geographical area may include a facility such as a school, a hostel, etc.

Further, at 904, the method 900 may include a step of analyzing, using the processing device, the blueprint and the at least one supervisee data.

Further, at 906, the method 900 may include a step of determining, using the processing device, a location of the supervisee on the blueprint based on the analyzing of the blueprint and the at least one supervisee data. Further, the generating of the supervision data may be based on the determining.

Further, in some embodiments, the at least one supervisee device may include at least one sensor. Further, the at least one sensor may be configured for detecting at least one signal made by the supervisee. Further, the at least one signal may include a gesture signal, a sound signal, etc. Further, the at least one sensor may be configured for generating the at least one supervisee data based on the detecting.

Figure 10:
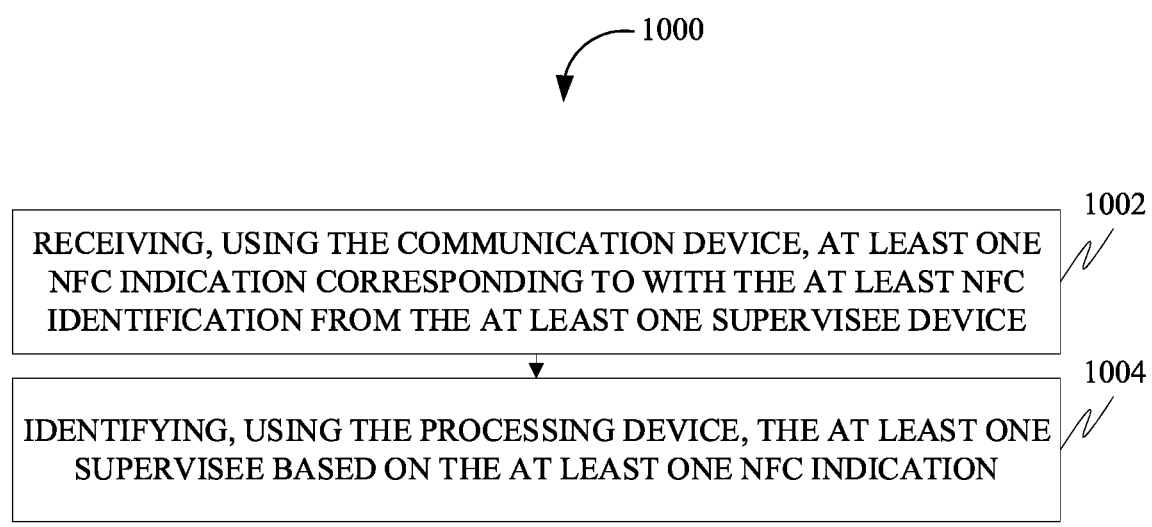
FIG. 10 is a flowchart of a method for facilitating identification of a supervisee using NFC based on the geofencing, in accordance with some embodiments.

FIG. 10 is a flowchart of a method 1000 for facilitating identification of a supervisee using NFC based on the geofencing, in accordance with some embodiments. Accordingly, at 1002, the method 1000 may include a step of receiving, using the communication device, at least one NFC indication corresponding to with the at least NFC identification from the at least one supervisee device. Further, the supervisee may be associated with the at least one NFC identification.

Further, at 1002, the method 1000 may include a step of identifying, using the processing device, the at least one supervisee based on the at least one NFC indication.

Figure 11:
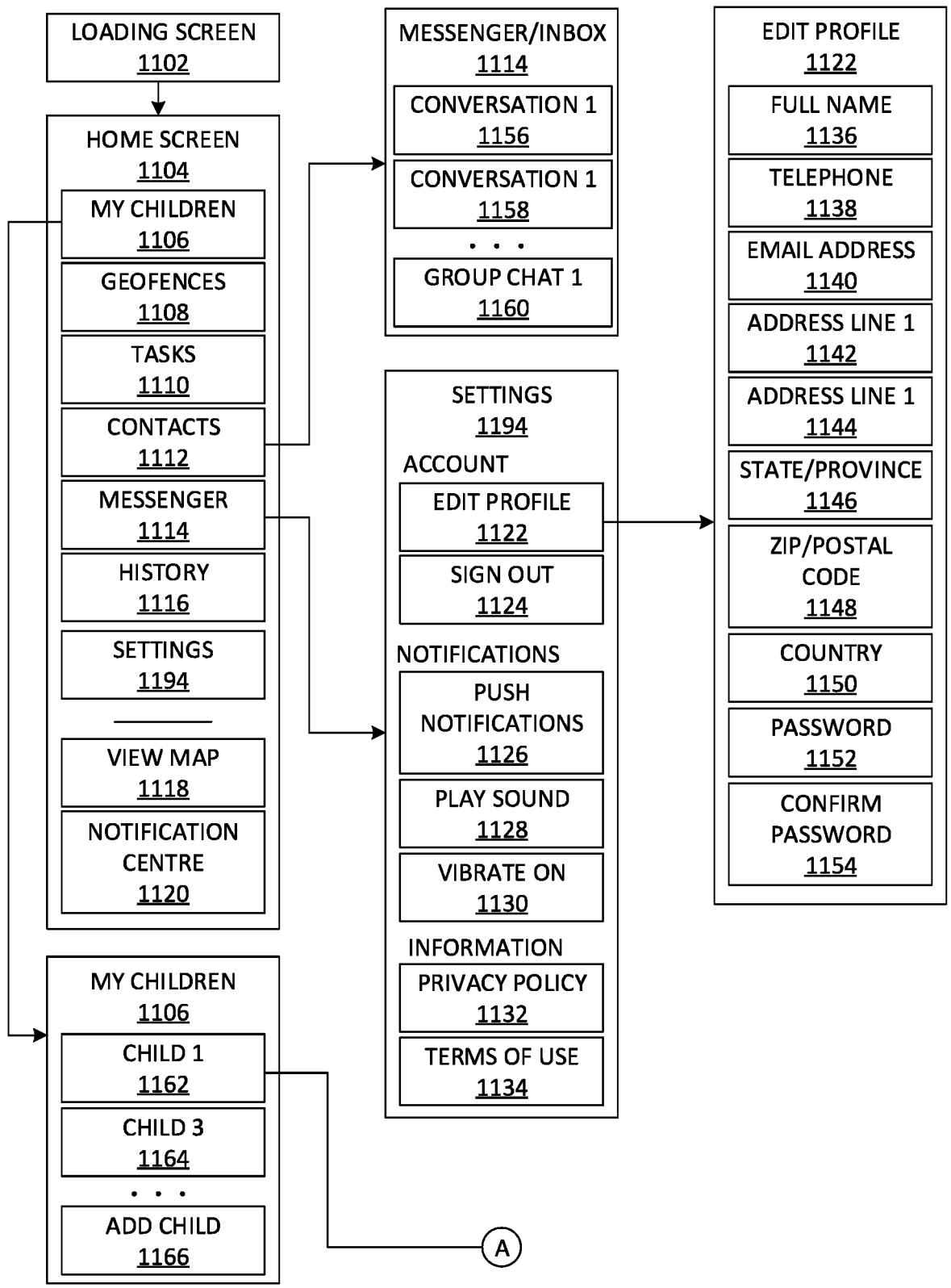
FIG. 11 is a flow diagram illustrating various navigation paths with respect to user interfaces available for a supervisor device, in accordance with some embodiments.

FIG. 11 is a flow diagram illustrating various navigation paths with respect to user interfaces available for a supervisor device, in accordance with some embodiments. Further, the user interface, in an instance, may include a loading screen 1102. Further, the user interface, in an instance, may include a home screen 1104 which may include options such as (but not limited to) "My Children" 1106 (for managing users), "Geofences 1108," "tasks 1110," "contacts 1112," "messenger 1114," "history 1116," "settings 1194," "notification center 1120," and/or "view map 1118." Further, the settings 1194, in an instance, may include options such as (but not limited to) edit profile 1122, sign out 1124, push notifications 1126, play sound 1128, vibrate on 1130, privacy policy 1132, and/or terms of use 1134. Further, the Edit profile 1122, in an instance, may also allow the supervisor to edit credentials such as (but not limited to) full name 1136, telephone 1138, email address 1140, address line 1 1142, address line 2 1144, state/province 1146, zip/postal code 1148, country 1150, password 1152, and confirm password 1154. Further, the messenger 1114, in an instance, may allow the supervisor to view and/or follow conversations (conversion 1 1156, conversation 1 1158, and group chat 1 1160) with other users (such as the supervised users). Further, My Children option 1106 from the home screen, in an instance, may allow the supervisor to add profile associated with the supervised user. Further, My Children option 1106 may include child 1 1162, child 3 1164, and add child 1166.

Figure 12:
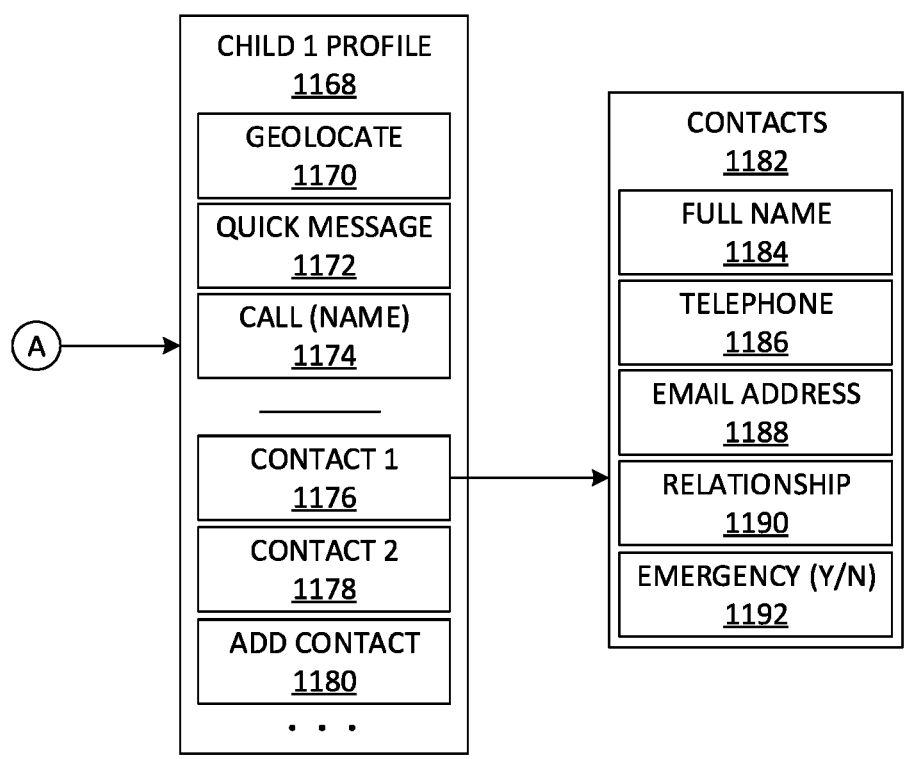
FIG. 12 is a continuation flow diagram of a method used for explaining processes carried out as shown in FIG. 11.

FIG. 12 is a continuation flow diagram of a method used for explaining processes carried out as shown in FIG. 11. Further, the child 1 1162 may include a child 1 profile 1168, in an instance, may include options such as (but not limited to) GeoLocate 1170, Quick message 1172, call 1174, contact 1 1176, contact 2 1178, and add contact 1180. Further, the contact 1 1176 that may further include contacts 1182 such as full name 1184, telephone 1186, email address 1188, relationship 1190, emergency (y/n) 1192.

Figure 13:
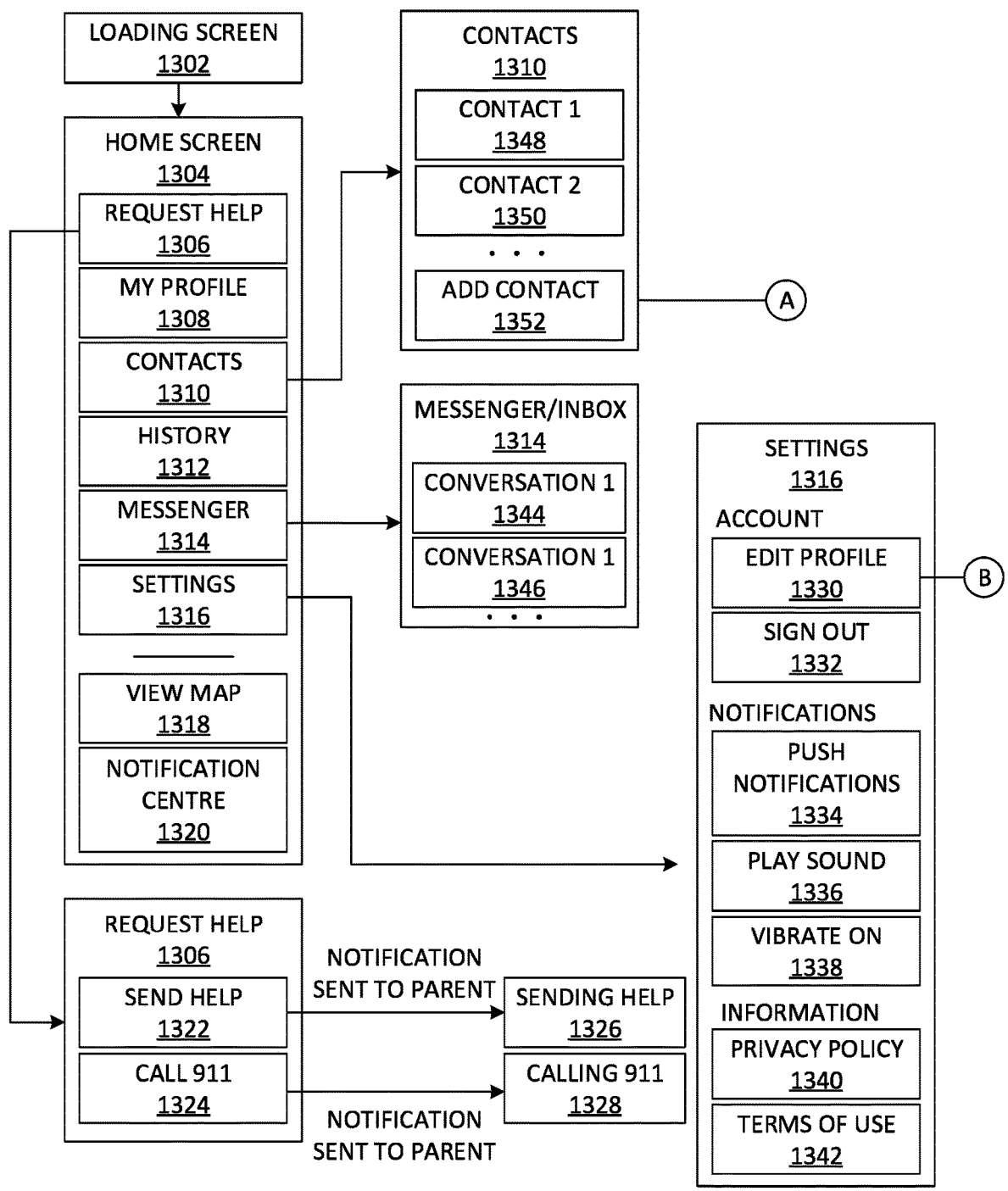
FIG. 13 is a flow diagram illustrating various navigation paths with respect to user interfaces available for a supervised user device, in accordance with some embodiments.

FIG. 13 is a flow diagram illustrating various navigation paths with respect to user interfaces available for a supervised user device, in accordance with some embodiments. Further, the user interface, in an instance, may include a loading screen 1302. Further, the user interface, in an instance, may include a home screen 1304 which may include options such as (but not limited to) a request help 1306, my profile 1308, contacts 1310, history 1312, messenger 1314, settings 1316, notification center 1320, and/or view map 1318. Further, the request help 1306 (as shown in FIG. 9), in an instance, may include (but not limited to) send help 1322, and/or call 911 1324. Further, the supervised user, in an instance, may select "send help" 1322, and/or call 911 1324 from the request help that may send a notification to the supervisor device (sending help 1326 and/or calling 911 1328). Further, the settings 1316, in an instance, may include options such as (but not limited to) edit profile 1330, sign out 1332, push notifications 1334, play sound 1336, vibrate on 1338, privacy policy 1340, and/or terms of use 1342. Further, the messenger 1314, in an instance, may allow the supervised user to view and/or follow conversations (conversation 1 1344 and conversation 1 1346) with other users. Further, the contacts 1310 may include contact 1 1348, contact 2 1350, and add contact 1352.

Figure 14:
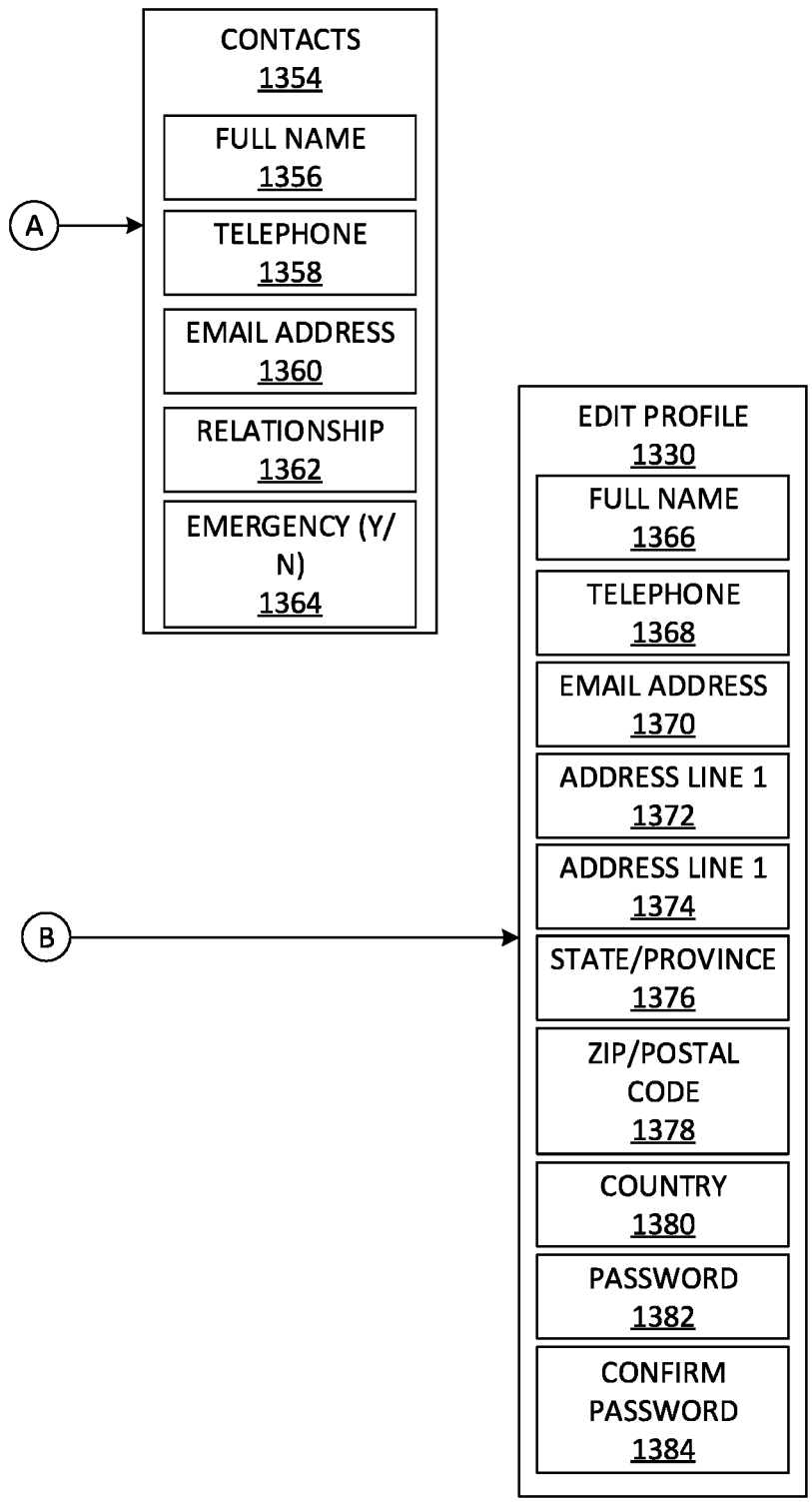
FIG. 14 is a continuation flow diagram of a method used for explaining processes carried out as shown in FIG. 13.

FIG. 14 is a continuation flow diagram of a method used for explaining processes carried out as shown in FIG. 13. Further, the add contact 1352 from the home screen may include contacts 1354 (such as full name 1356, telephone 1358, email address 1360, relationship 1362, emergency (y/n) 1364) associated with other users. Further, the Edit profile 1330, in an instance, may also allow the supervised user to edit credentials such as (but not limited to) full name 1366, telephone 1368, email address 1370, address line 1 1372, address line 2 1374, state/province 1376, zip/postal code 1378, country 1380, password 1382, and confirm password 1384.

Figure 15:
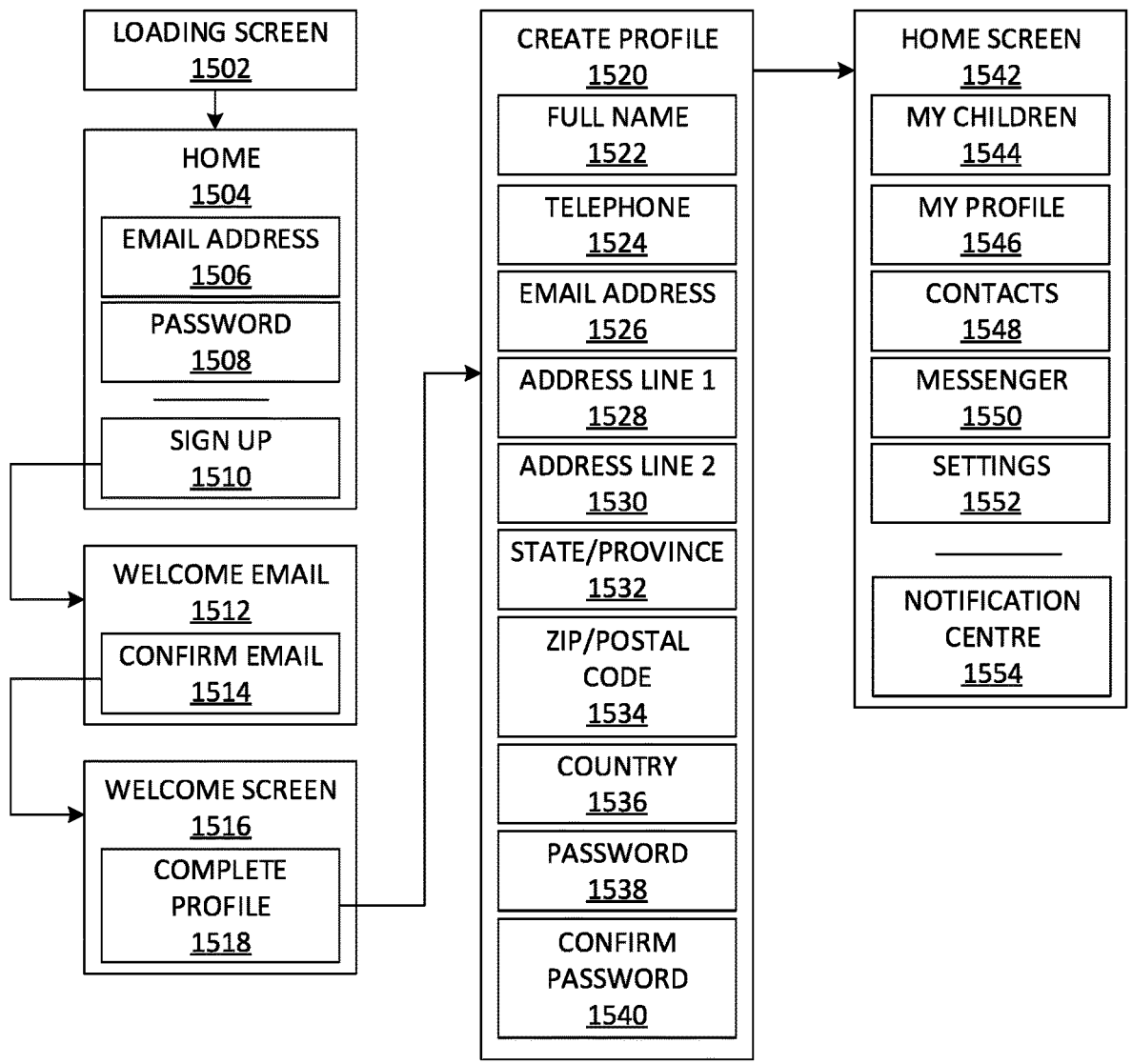
FIG. 15 is a flow diagram illustrating various navigation paths with respect to user interfaces available for a supervisor device at the online platform, in accordance with some embodiments.

FIG. 15 is a flow diagram illustrating various navigation paths with respect to user interfaces available for a supervisor device at the online platform 4200, in accordance with some embodiments. Further, the user interface, in an instance, may include a loading screen 1502. Further, the user interface, in an instance, may include a home 1504 which may include options such as email address 1506, password 1508, and sign up 1510. Further, the sign up 1510 may include a welcome email 1512 which further may include a confirm email 1514. Further, a welcome screen 1516 may include a complete profile 1518. Further, a create profile 1520, in an instance, may also allow the supervisor to edit credentials such as (but not limited to) full name 1522, telephone 1524, email address 1526, address line 1 1528, address line 2 1530, state/province 1532, zip/postal code 1534, country 1536, password 1538, and confirm password 1540. Further, a home screen 1542 may include my children 1544, my profile 1546, contacts 1548, messenger 1550, settings 1552, and notification centre 1554.

Figure 16:
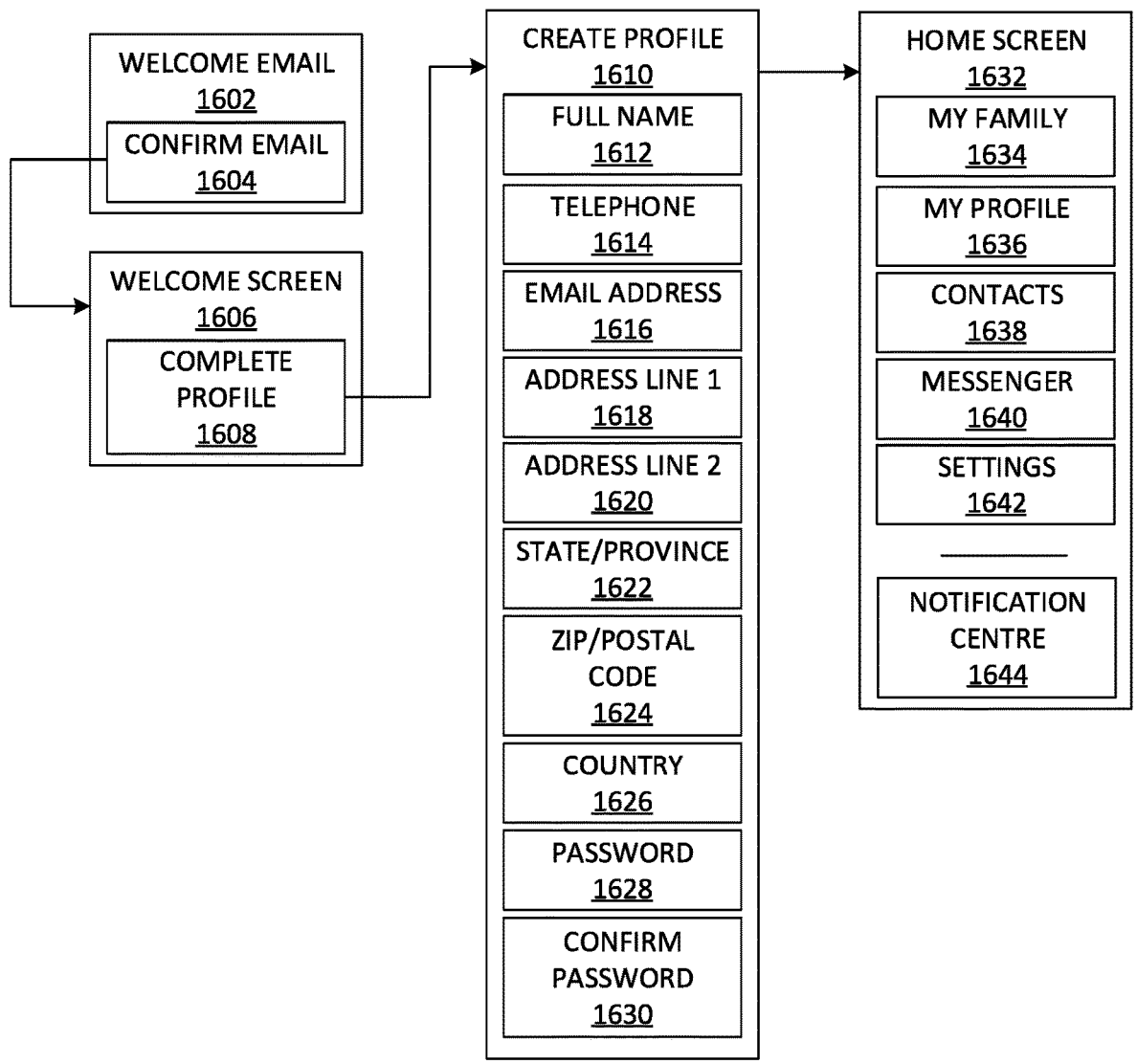
FIG. 16 is a flow diagram illustrating various navigation paths with respect to user interfaces available for a supervised user device to create a profile for a supervised user at the online platform, in accordance with some embodiments.

FIG. 16 is a flow diagram illustrating various navigation paths with respect to user interfaces available for a supervised user device to create a profile for a supervised user at the online platform 4200, in accordance with some embodiments. Further, a supervisor (such as parents) may create the profile for a child by interacting with the supervisor device. Further, the child may receive a welcome email 1602 or text message. Further, the welcome email 1602 may include a confirmation email 1604. Further, a welcome screen 1606 may include a complete profile 1608. Further, create profile 1610 may include full name 1612, telephone 1614, email address 1616, address line 1 1618, address line 2 1620, state/province 1622, zip/postal code 1624, country 1626, password 1628, and confirm password 1630. Further, a home screen 1632 may include my family 1634, my profile 1636, contacts 1638, messenger 1640, settings 1642, and notification centre 1644.

Figure 17:
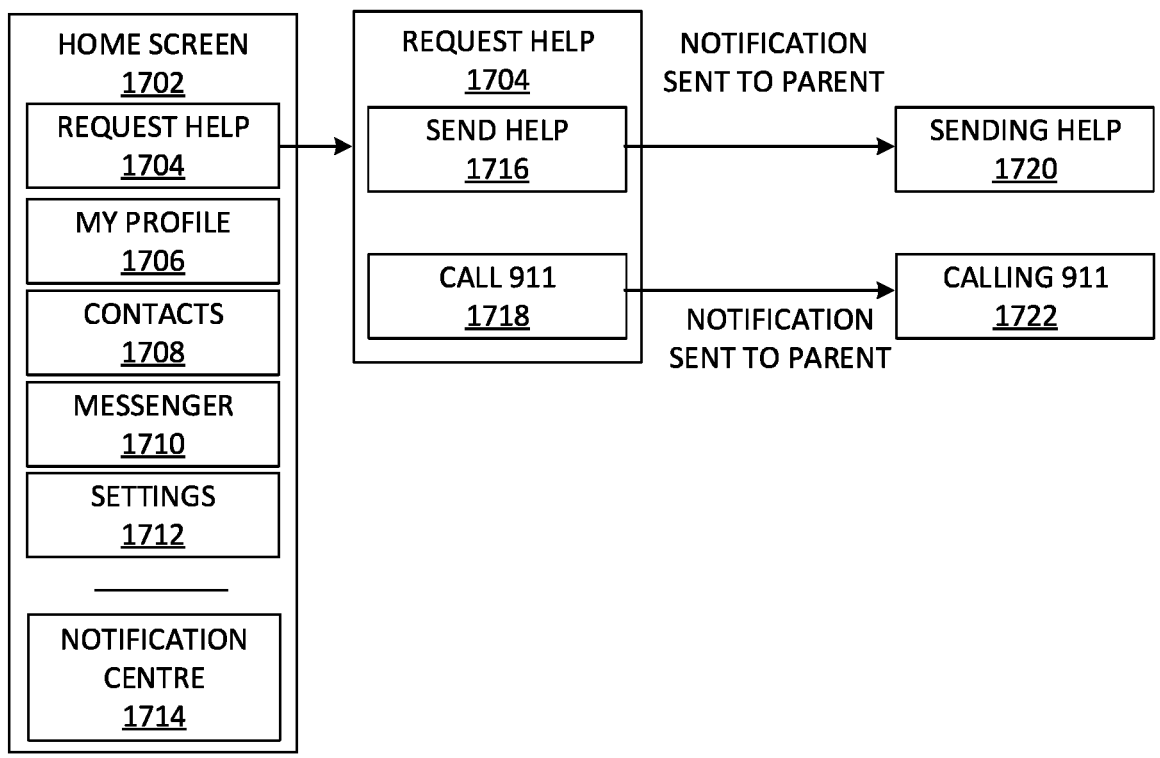
FIG. 17 is a flow diagram illustrating various navigation paths with respect to user interfaces available for a supervised user device to send an emergency alert, in accordance with some embodiments.

FIG. 17 is a flow diagram illustrating various navigation paths with respect to user interfaces available for a supervised user device to send an emergency alert, in accordance with some embodiments. Further, the user interface may include a home screen 1702 which further may include a request help 1704, my profile 1706, contacts 1708, messenger 1710, settings 1712, and notification centre 1714. Further, the request help 1704, in an instance, further may include a send help 1716 and call 911 1718. Further, the supervised user, in an instance, may select "send help" 1716, and/or call 911 1718 from the request help that may send a notification to the supervisor device (sending help 1720 and/or calling 911 1722).

Figure 18:
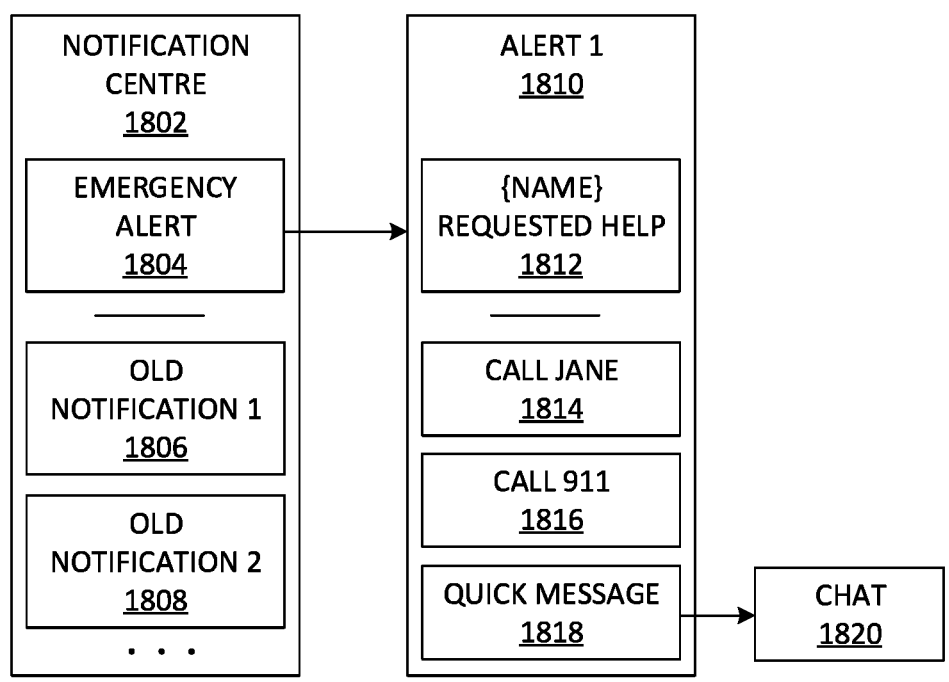
FIG. 18 is a flow diagram illustrating various navigation paths with respect to user interfaces available when a supervised user (such as a child) may request for help and a supervisor (such as a parent) may receive a notification through the supervisor device, in accordance with some embodiments.

FIG. 18 is a flow diagram illustrating various navigation paths with respect to user interfaces available when a supervised user (such as a child) may request for help and a supervisor (such as a parent) may receive a notification through the supervisor device, in accordance with some embodiments. Further, the child may request for help. Further, a supervisor (such as a parent) may receive a notification informing that the child may have requested for the help from their parent. Further, the user interface may include a notification centre 1802 which further may include an emergency alert 1804, old notification 1 1806, and old notification 2 1808, etc. Further, the emergency alert 1804, in an instance, may include an alert 1 1810 that may further include requested help 1812, call jane 1814, call 911 1816, and quick message 1818. Further, the quick message further may include chat 1820.

Figure 19:
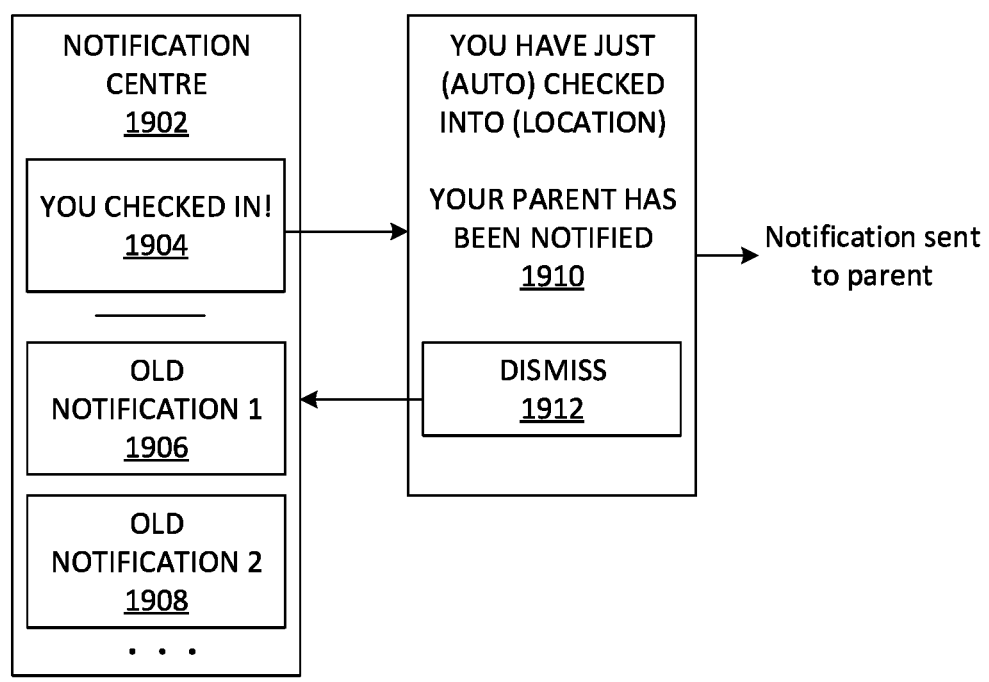
FIG. 19 is a flow diagram illustrating various navigation paths with respect to user interfaces available when the supervised user (such as a child) may auto-check into the geofence, in accordance with some embodiments.

FIG. 19 is a flow diagram illustrating various navigation paths with respect to user interfaces available when the supervised user (such as a child) may auto-check into the geofence, in accordance with some embodiments. Further, the child may reach the specific location. Further, the child may receive a notification requesting a check-in. Further, the user interface may include a notification centre 1902. Further, the notification centre 1902 may include you checked in! 1904, old notification 1 1906, old notification 2 1908, etc. Further, the supervisor (parent) may be notified 1910 after the child has auto checked into the location. Further, the supervisor (such as parent) may dismiss 1912 the notification.

Figure 20:
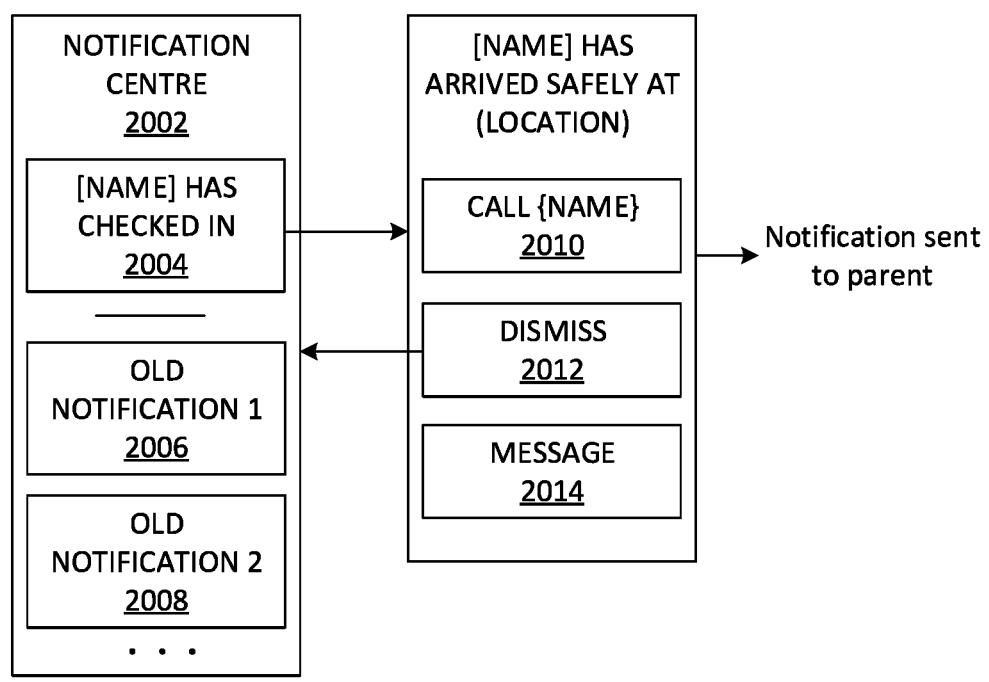
FIG. 20 is a flow diagram illustrating various navigation paths with respect to user interfaces available when a supervised user (such as a child) may reach the geofence and a supervisor (such as a parent) may receive a notification through the supervisor device, in accordance with some embodiments.

FIG. 20 is a flow diagram illustrating various navigation paths with respect to user interfaces available when a supervised user (such as a child) may reach the geofence and a supervisor (such as a parent) may receive a notification through the supervisor device, in accordance with some embodiments. Further, the supervisor may be informed that the supervised user (and/or the child) has checked in to a specific location (geofence). Further, the child may reach the location. Further, a supervisor (such as a parent) may receive a notification informing that the child may have checked in into a specific location. Further, the user interface may include a notification centre 2002. Further, the notification centre 2002 may include (NAME) has checked in 2004, old notification 1 2006, old notification 2 2008, etc. Further, the (NAME) may arrive safely at the location. Further, the supervisor (such as parent) may call (NAME) 2010, message 2014, and dismiss 2012 the notification.

Figure 21:
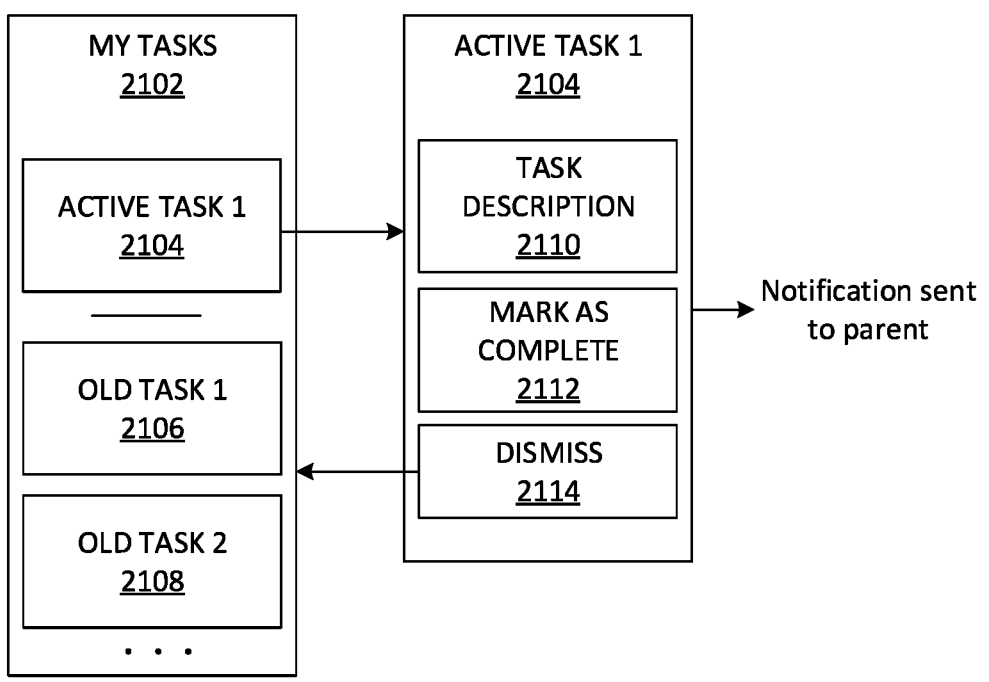
FIG. 21 is a flow diagram illustrating various navigation paths with respect to user interfaces available when the supervised user (such as a child) may reach a location (such as the geofence) and the child may receive a notification requesting a check-in, in accordance with some embodiments.

FIG. 21 is a flow diagram illustrating various navigation paths with respect to user interfaces available when the supervised user (such as a child) may reach a location (such as the geofence) and the child may receive a notification requesting a check-in, in accordance with some embodiments. Further, the child may reach the location. Further, the child may receive the notification requesting a check-in. Further, the user interface may include my tasks 2102 which further may include active task 1 2104, old task 1 2106, old task 2 2108, etc. Further, the active task 1 2104 further may include task description 2110, mark as complete 2112, and dismiss 2114.

Figure 22:
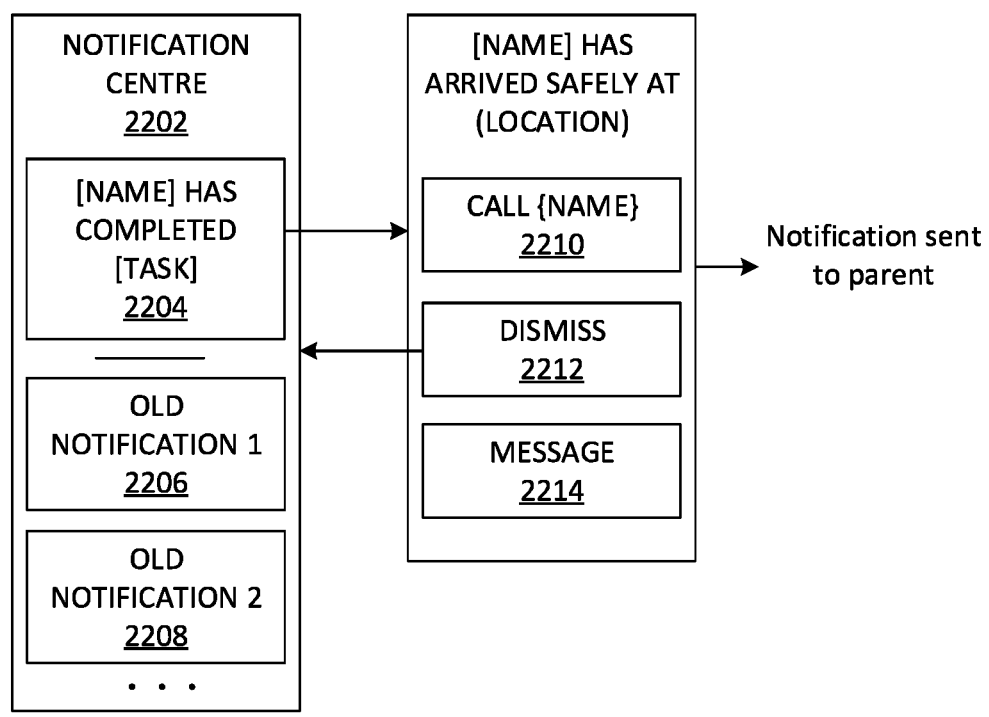
FIG. 22 is a flow diagram illustrating various navigation paths with respect to user interfaces available when the supervised user (such as a child) may reach a location (such as the geofence) and a supervisor (such as a parent) may receive a notification through the supervisor device, in accordance with some embodiments.

FIG. 22 is a flow diagram illustrating various navigation paths with respect to user interfaces available when the supervised user (such as a child) may reach a location (such as the geofence) and a supervisor (such as a parent) may receive a notification through the supervisor device, in accordance with some embodiments. Further, the supervisor may be informed that the supervised user (and/or the child) has checked in to a specific location (geofence). Further, the parent may receive a notification informing that the child may have checked into a specific location. Further, the user interface may include a notification centre 2202 which further may include (NAME) may have completed the task 2204, old notification 1 2206, old notification 2 2208, etc. Further, (NAME) may have safely arrived at the location. Further, the supervisor (such as a parent) may call (NAME) 2210, message 2214, and dismiss 2212 the notification.

Figure 23:
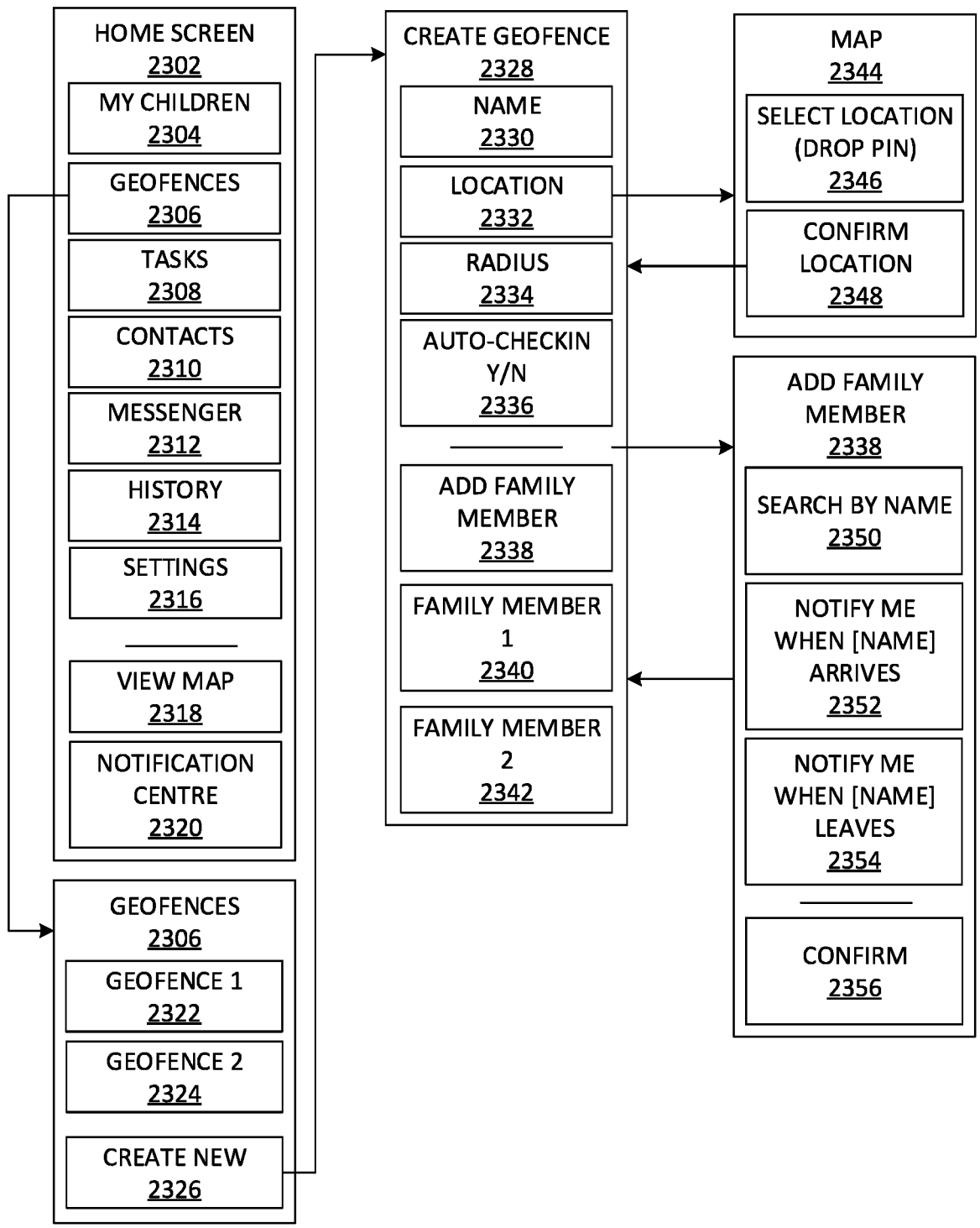
FIG. 23 is a flow diagram illustrating various navigation paths with respect to user interfaces available for the supervisor device when the supervisor (such as parents) may create the geofence, in accordance with some embodiments.

FIG. 23 is a flow diagram illustrating various navigation paths with respect to user interfaces available for the supervisor device when the supervisor (such as parents) may create the geofence, in accordance with some embodiments. Further, a child (supervised user) may reach a location. Further, the user interface may include a home screen 2302 which further may include my children 2304, geofences 2306, tasks 2308, contacts 2310, messenger 2312, history 2314, settings 2316, view map 2318, and notification centre 2320. Further, the geofences 2306 may include geofence 1 2322, geofence 2 2324, and create new 2326. Further, the create new 2326 may include creating geofence 2328. Further, the creating geofence 2328 may include a name 2330, a location 2332, a radius 2334, an auto-check-in Y/N 2336, add family member 2338, family member 1 2340, family member 2 2342, etc.

Further, the location 232 may include a map 2344. Further, the map 2344 may include selecting a location (drop pin) 2346 and confirming location 2348. Further, the add family member 2338 may include a search by name 2350, notify me when (NAME) arrives 2352, notify me when (NAME) leaves 2354, and confirm 2356.

Figure 24:
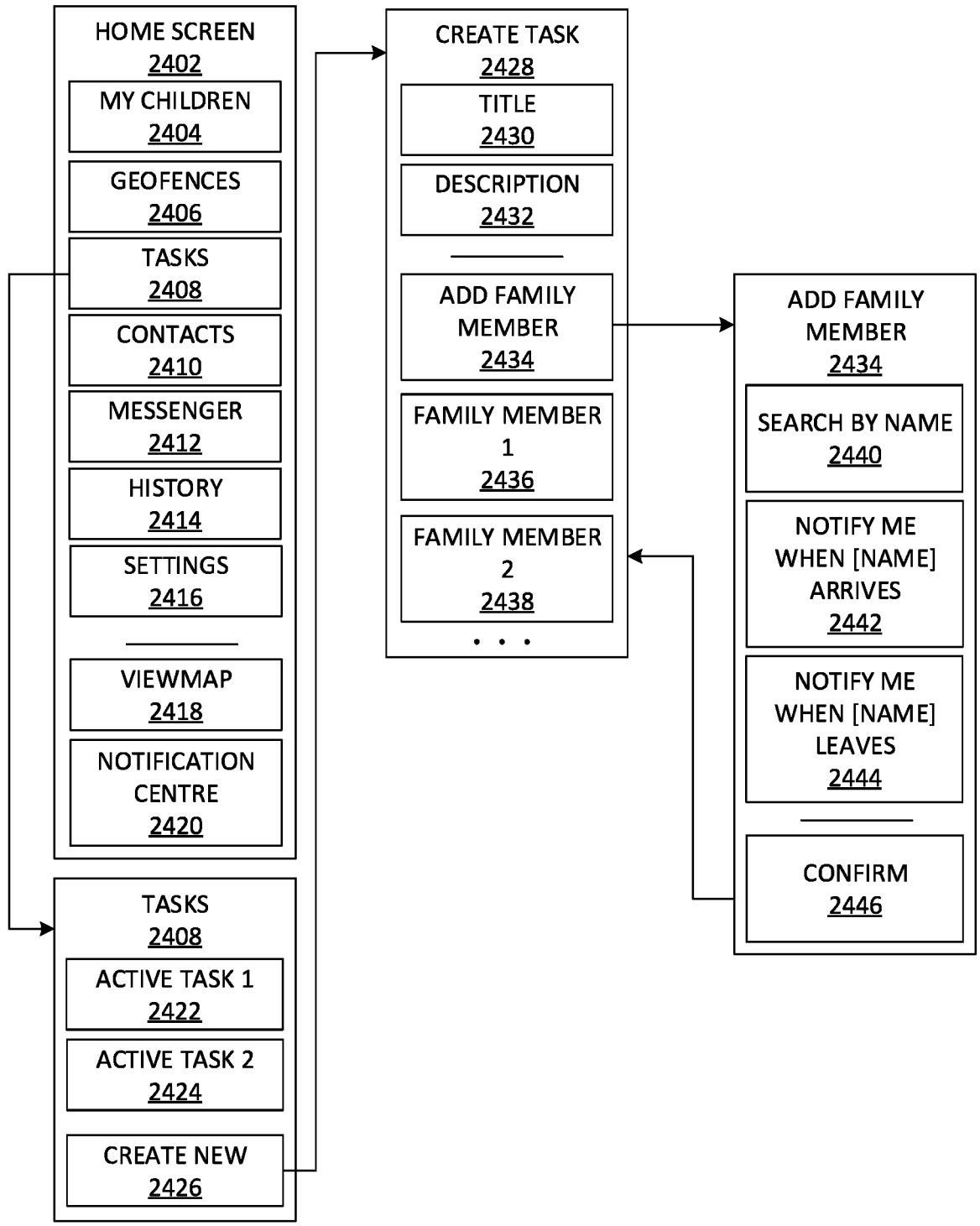
FIG. 24 is a flow diagram illustrating various navigation paths with respect to user interfaces available for the supervisor device when the supervisor (such as parents) may create a task, in accordance with some embodiments.

FIG. 24 is a flow diagram illustrating various navigation paths with respect to user interfaces available for the supervisor device when the supervisor (such as parents) may create a task, in accordance with some embodiments. Further, the user interface may include a home screen 2402 which further may include my children 2404, geofences 2406, tasks 2408, contacts 2410, messenger 2412, history 2414, settings 2416, view map 2418, and notification centre 2420. Further, the tasks 2408 may include active task 1 2422, active task 2 2424, create new 2426, etc. Further, the create new 2426 may include a create task 2428. Further, the create task 2428 further may include title 2430, description 2432, add family member 2434, family member 1 2436, family member 2 2438, etc. Further, the add family member 2434 may include a search by name 2440, notify me when (NAME) arrives 2442, notify me when (NAME) leaves 2444, and confirm 2446.

Figure 25:
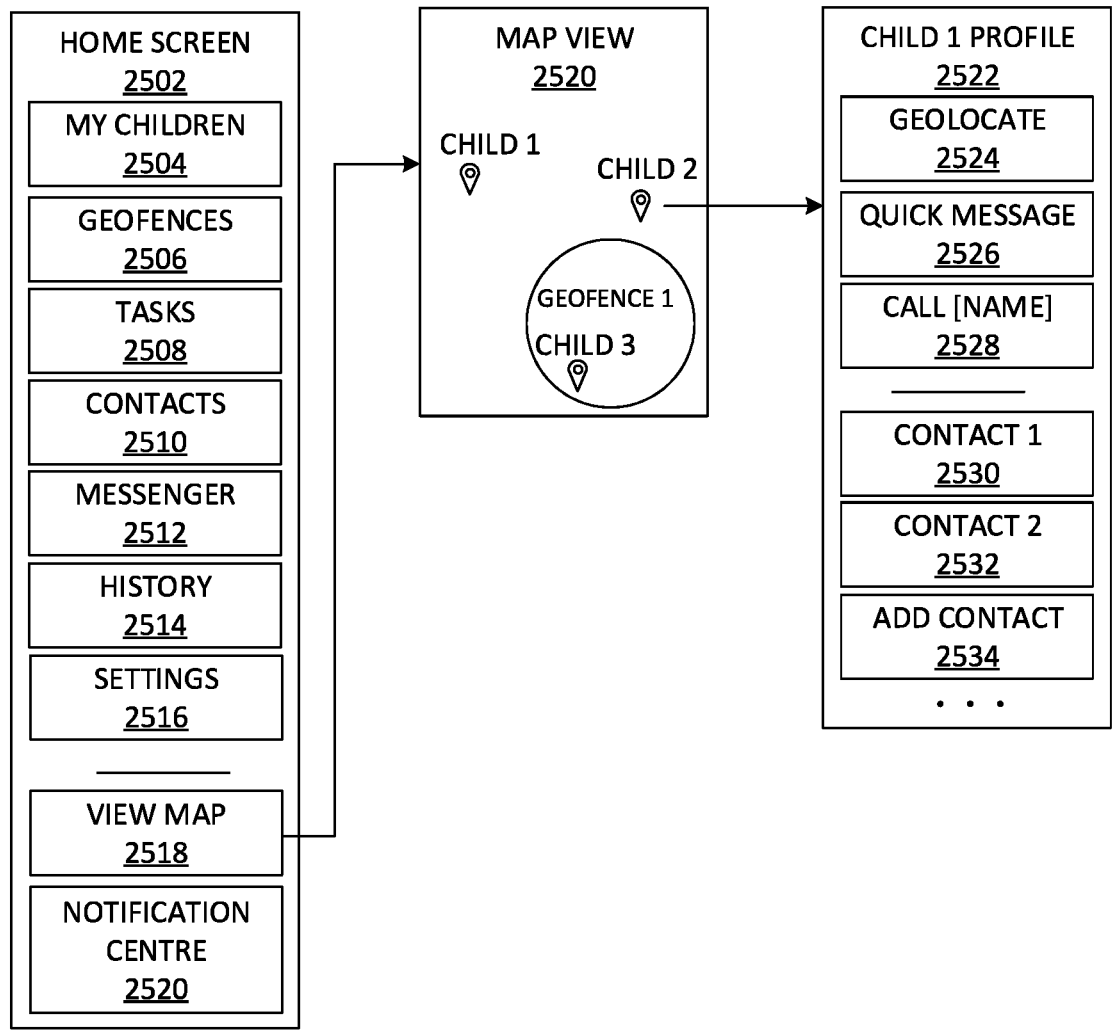
FIG. 25 is a flow diagram illustrating various navigation paths with respect to user interfaces available for the supervisor device when the supervisor (such as parents) may select the "Map View" option from the home screen, in accordance with some embodiments.

FIG. 25 is a flow diagram illustrating various navigation paths with respect to user interfaces available for the supervisor device when the supervisor (such as parents) may select the "Map View" option from the home screen, in accordance with some embodiments. Further, the user interface may include a home screen 2502 which further may include my children 2504, geofences 2506, tasks 2508, contacts 2510, messenger 2512, history 2514, settings 2516, view map 2518, and notification centre 2520. Further, the supervisor (such as parents) may view map on a map view 2520. Further, the map view 2520 may show the location of child 1, child 2, child 3, etc. Further, the child 1 may be associated with child 1 profile 2522. Further, the child 1 profile 2522 may include geoLocate 2524, quick message 2526, call (NAME) 2528, contact 1 2530, contact 2 2532, add contact 2534, etc.

Figure 26:
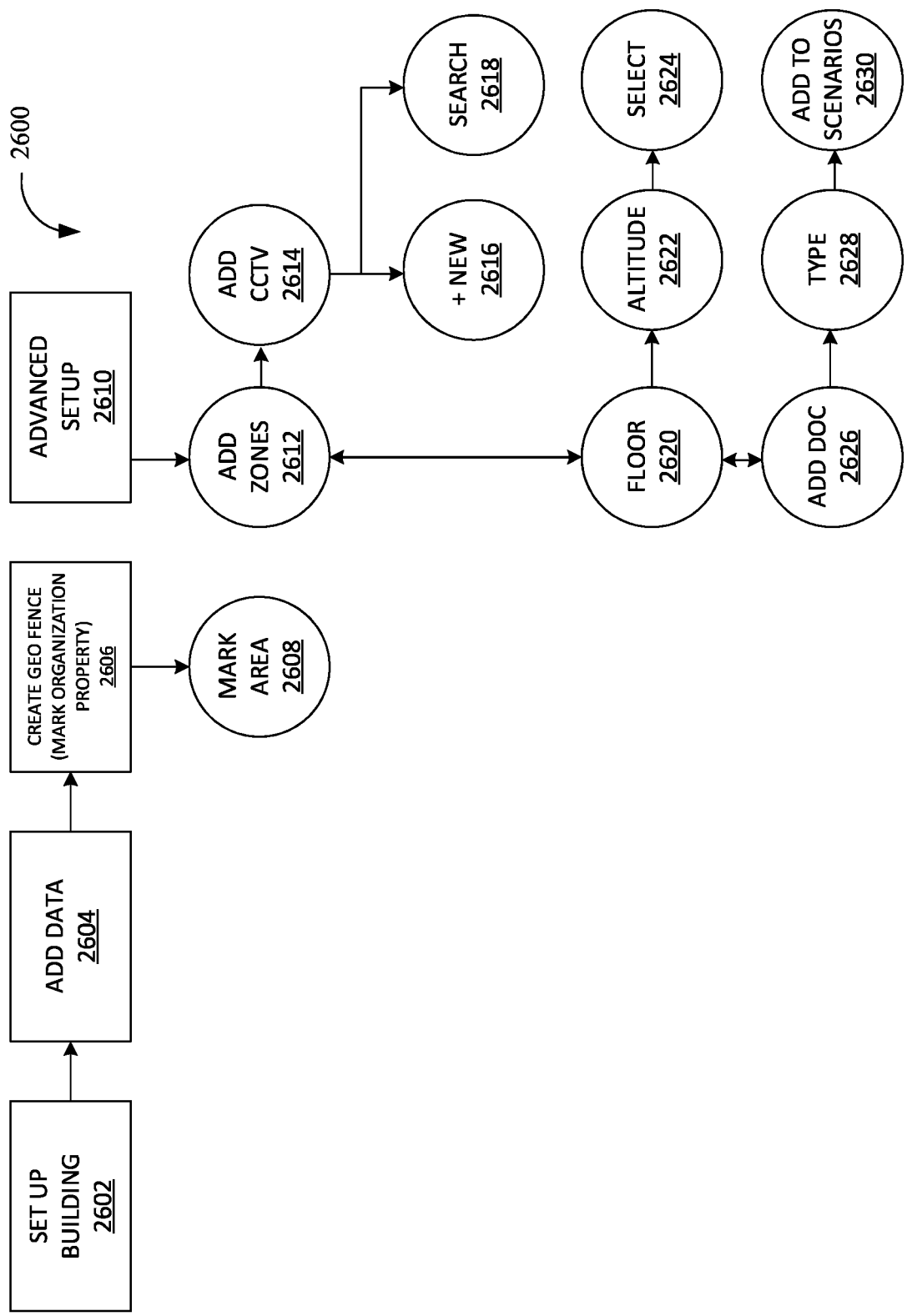
FIG. 26 is a flow diagram of a method for setting up a geofence, in accordance with some embodiments. Further, the method may include a step of setting up a building.

FIG. 26 is a flow diagram of a method 2600 for setting up a geofence, in accordance with some embodiments. Further, at 2602, the method 2600 may include a step of setting up a building. Further, at 2604, the method 2600 may include a step of adding data. Further, at 2606, the method 2600 may include a step of creating a geo fence (marking organization property). Further, at 2608, the method 2600 may include a step of marking an area.

Further, at 2610, the method 2600 may include an advanced setup. Further, at 2612, the method 2600 may include a step of adding zones. Further, at 2614, the method 2600 may include a step of adding CCTV. Further, at 2616, the method 2600 may include adding a new CCTV. Further, at 2618, the method 2600 may include a step of searching CCTV. Further, at 2620, the method 2600 may include a step of adding a floor. Further, at 2622, the method 2600 may include a step of determining the altitude of the floor. Further, at 2624, the method 2600 may include a step of selecting the floor. Further, at 2626, the method 2600 may include a step of adding a document. Further, at 2628, the method 2600 may include a step of determining the type of the document. Further, at 2630, the method 2600 may include a step of adding the document to scenarios.

Figure 27:
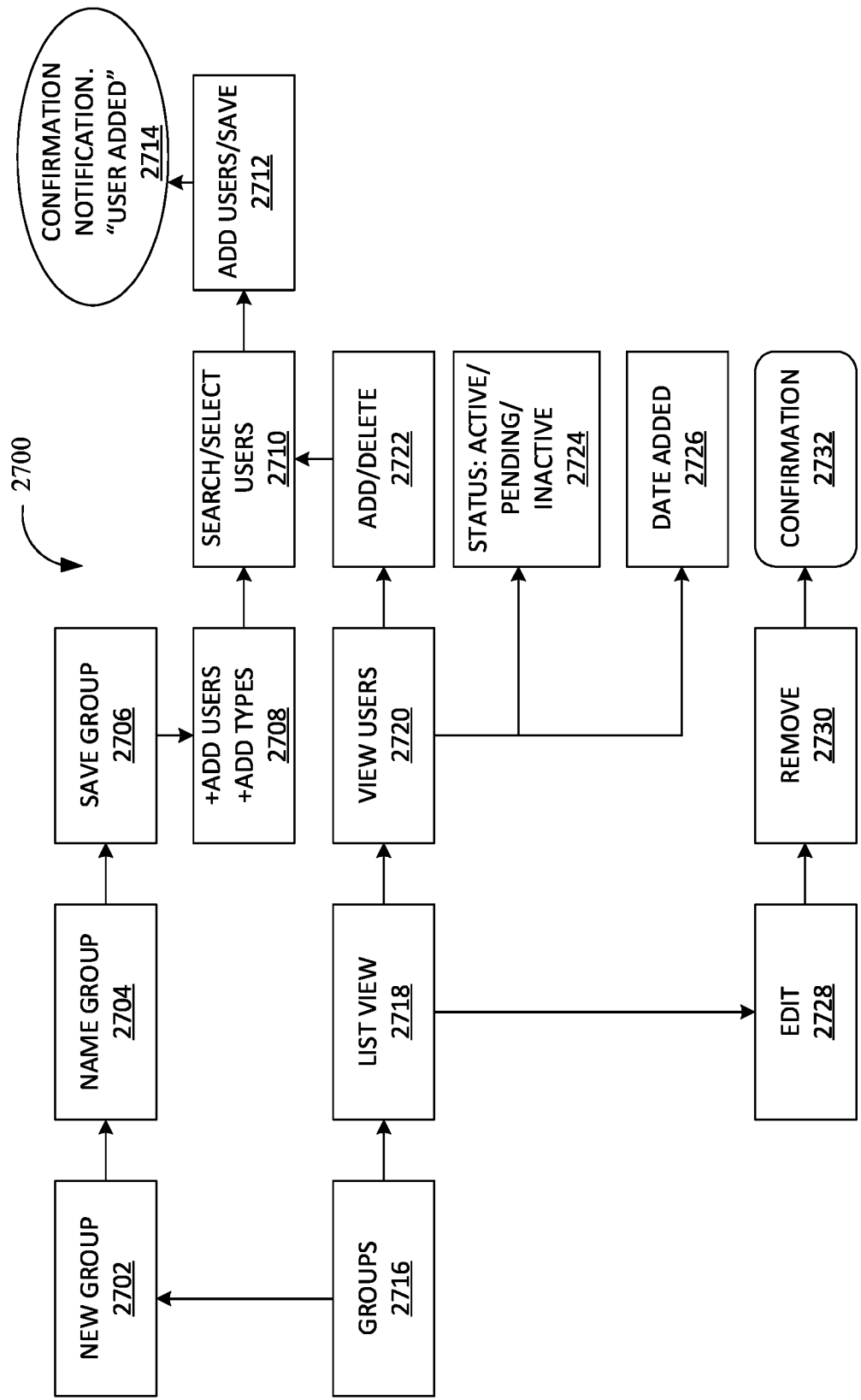
FIG. 27 is a flow diagram of a method for adding and/or removing users from a database (such as the database), in accordance with some embodiments.

FIG. 27 is a flow diagram of a method 2700 for adding and/or removing users from a database (such as the database 114), in accordance with some embodiments. Further, the method 2700 may include groups 2716. Further, at 2702, the method 2700 may include a step of creating a new group. Further, at 2704, the method 2700 may include a step of naming the new group. Further, at 2706, the method 2700 may include a step of saving the new group. Further, at 2708, the method 2700 may include a step of adding users and types. Further, at 2710, the method 2700 may include a step of selecting or searching users. Further, at 2712, the method 2700 may include a step of adding or saving users. Further, at 2714, the method 2700 may include a step of confirming transmitting a confirmation notification (user added). Further, at 2718, the method 2700 may include a step of inspecting a list view. Further, at 2720, the method 2700 may include a step of viewing users. Further, at 2722, the method 2700 may include a step of adding or deleting. Further, at 2724, the method 2700 may include a step of viewing status that may be active, pending or inactive. Further, at 2726, the method 2700 may include a step of adding a date. Further, at 2728, the method 2700 may include a step of editing the users. Further, at 2730, the method 2700 may include a step of removing the users. Further, at 2732, the method 2700 may include a step of providing a confirmation.

Figure 28:
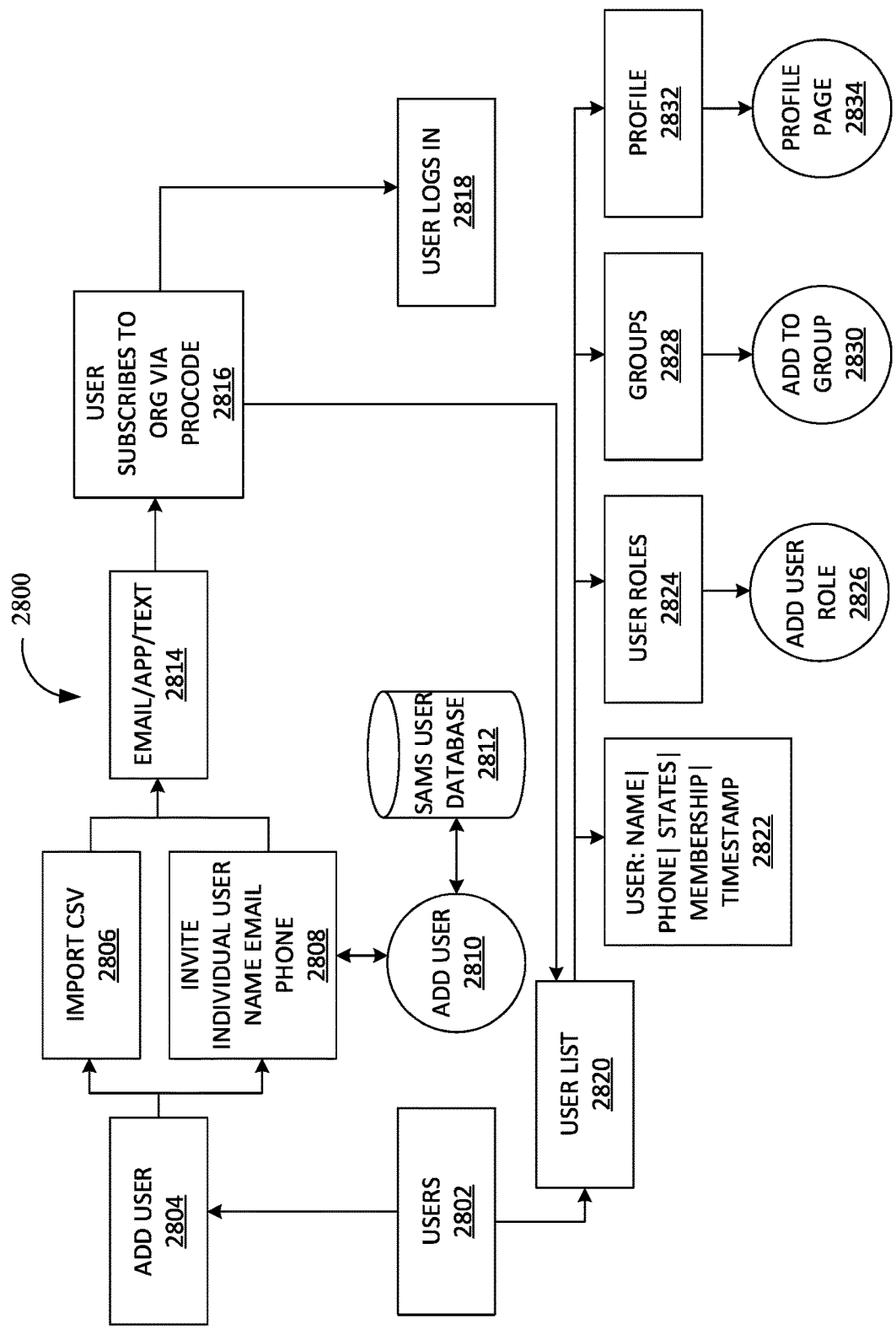
FIG. 28 is a flow diagram of a method for user login, in accordance with some embodiments.

FIG. 28 is a flow diagram of a method 2800 for user login, in accordance with some embodiments. Further, the method 2800 may include users 2802. Further, at 2804, the method 2800 may include a step of adding a user. Further, at 2806, the method 2800 may include a step of importing CSV. Further, at 2808, the method 2800 may include a step of inviting an individual user with a name, email, and phone number. Further, the individual user may be app user 2810. Further, the individual user may be retrieved from sams user database 2812. Further, at 2814, the method 2800 may include a step of sending an email/text/app. Further, at 2816, the method 2800 may include a step of subscribing to ORG via PROCODE by the users. Further, at 2818, the method 2800 may include a step of logging in by the users. Further, at 2820, the method 2800 may include a step of listing users. Further, at 2822, the method 2800 may include a step of determining user's name, email, phone number, status, membership, and timestamp. Further, at 2824, the method 2800 may include a step of determining the role of the user. Further, at 2824, the method 2800 may include a step of determining user roles. Further, at 2826, the user may add user roles. Further, at 2828, the method 2800 may include a step of determining groups of the users. Further, at 2830, the user may be added to the group. Further, at 2832, the method 2800 may include a step of determining the profile of the users. Further, at 2834, the user may create a profile page.

Figure 29:
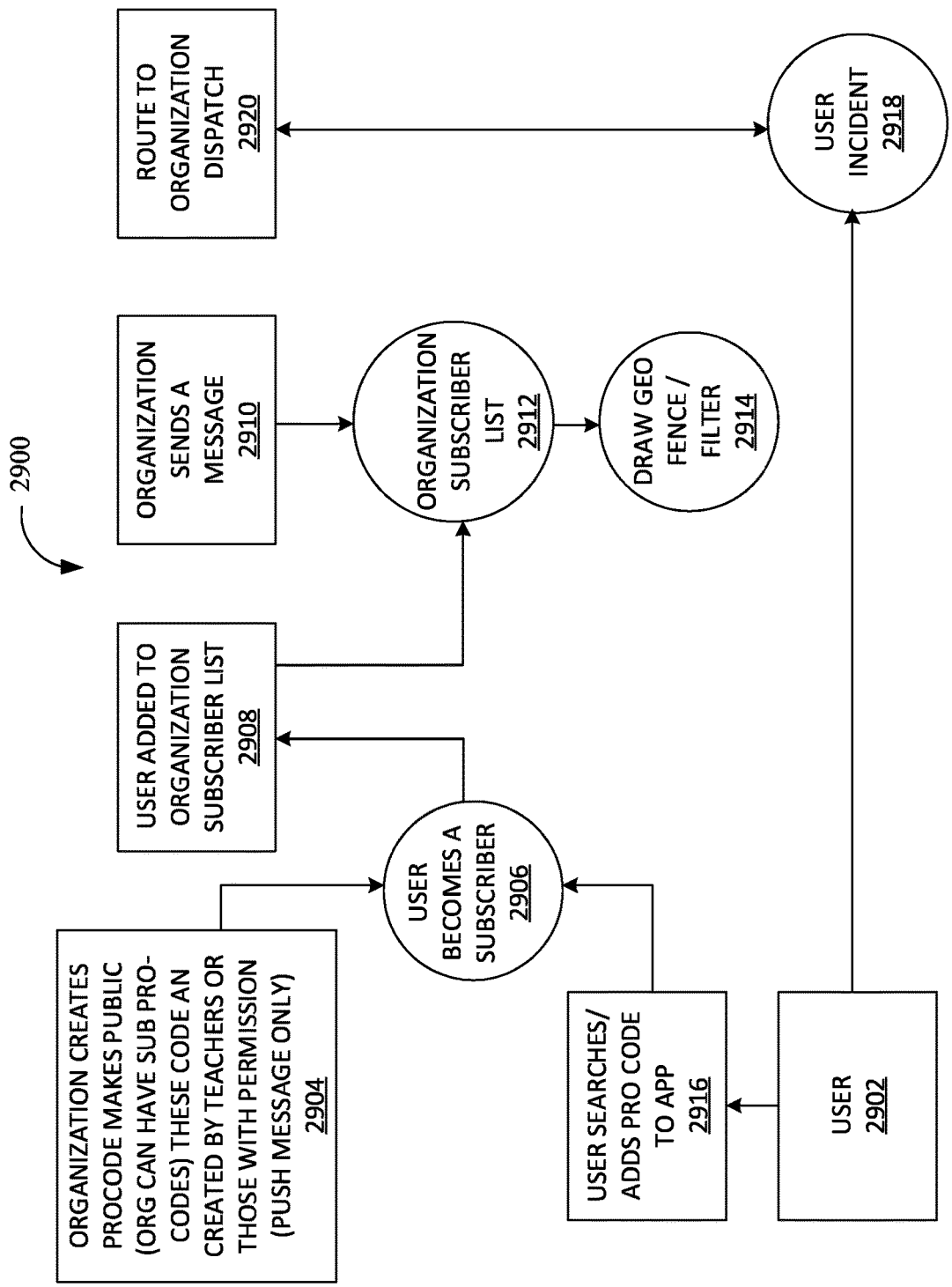
FIG. 29 is a flow diagram of a method for adding a user to an organization subscriber list, in accordance with some embodiments.

FIG. 29 is a flow diagram of a method 2900 for adding a user to an organization subscriber list, in accordance with some embodiments. Therefore, if an organization sends a message, then the user (that may be added in the organization subscriber list) may receive the message as well. Further, 2902, the method 2900 may include a user. Further, 2904, the method 2900 may include a step of creating ProCode by organization (organization may have sub-Procodes) and making public. Further, the ProCode may be created by teachers or those with permission (push message only). Further, 2906, the user may become a subscriber. Further, 2908, the method 2900 may include a step of adding the user to an organization subscriber list. Further, 2910, the method 2900 may include a step of sending a message by the organization. Further, 2912, the message may be sent to the organization subscriber list. Further, 2914, the method 2900 may include a step of drawing geofence/filter. Further, at 2916, the method 2900 may include a step of searching or adding pro code to an app by the user. Further, 2918, the method 2900 may include a user incident. Further, 2920, the method 2900 may include a route to organization dispatch.

Figure 30:
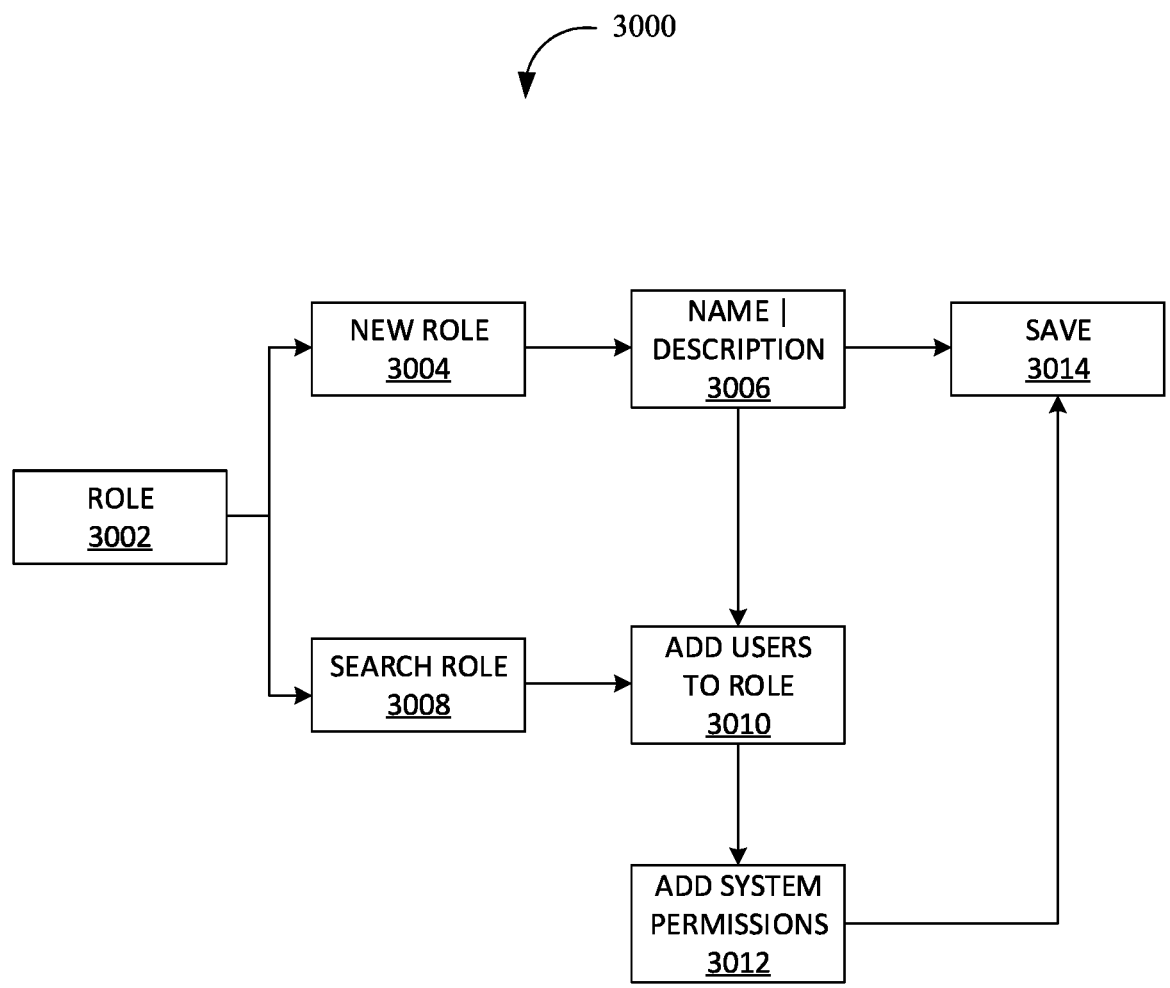
FIG. 30 is a flow diagram of a method for adding a role corresponding to a user, in accordance with some embodiments.

FIG. 30 is a flow diagram of a method 3000 for adding a role corresponding to a user, in accordance with some embodiments. Further, at 3002, the method 3000 may include a role. Further, at 3004, the method 3000 may include a step of assigning a new role. Further, at 3006, the method 3000 may include a step of providing name and description of the new role. Further, at 3008, the method 3000 may include a step of searching roles. Further, at 3010, the method 3000 may include a step of adding users to the role. Further, at 3012, the method 3000 may include a step of adding system permissions. Further, at 3014, the method may include a step of saving the roles.

Figure 31:
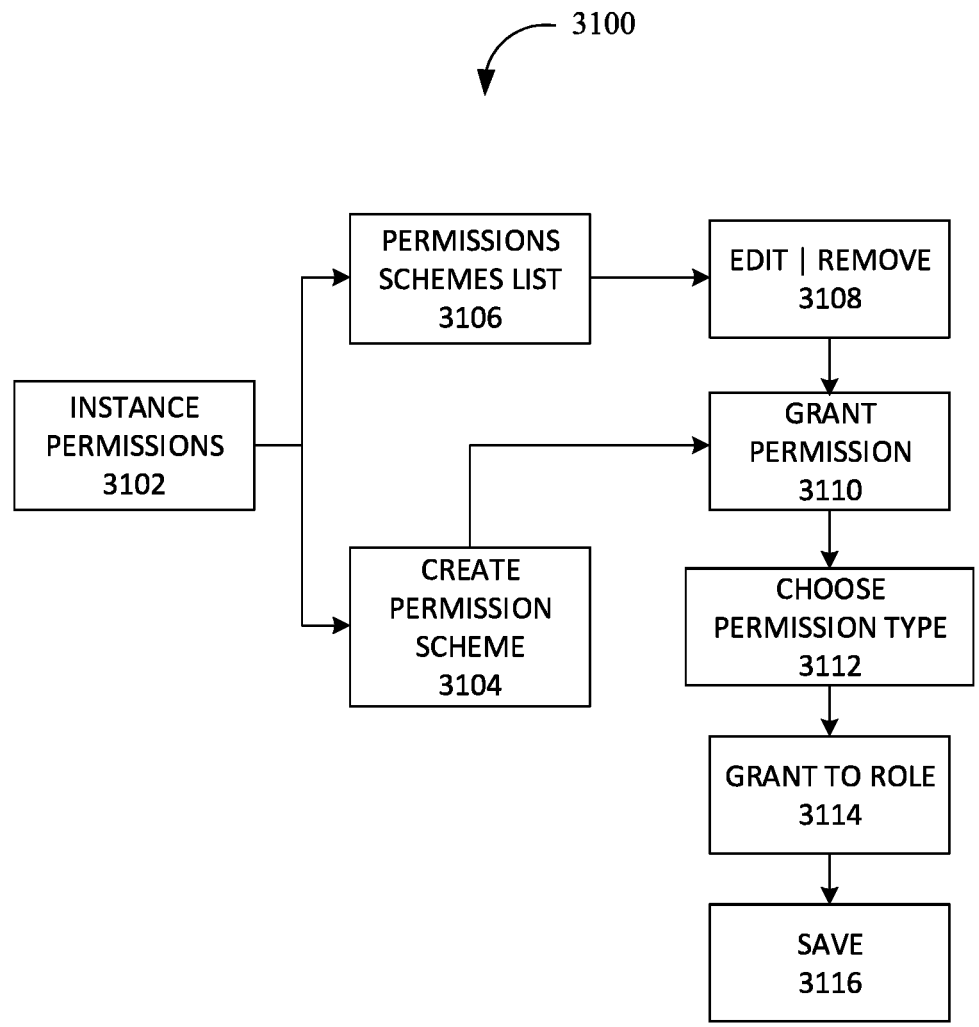
FIG. 31 is a flow diagram of a method for granting permission associated with the role corresponding to a user, in accordance with some embodiments.

FIG. 31 is a flow diagram of a method 3100 for granting permission associated with the role corresponding to a user, in accordance with some embodiments. Further, at 3102, the method 3100 may include instance permissions. Further, at 3104, the method 3100 may include a step of creating a permission scheme. Further, at 3106, the method 3100 may include a step of listing permission schemes. Further, at 3108, the method 3100 may include a step of editing or removing permissions. Further, at 3110, the method 3100 may include a step of granting permission. Further, at 3112, the method 3100 may include a step of choosing a permission type. Further, at 3114, the method 3100 may include a step of granting to the role. Further, at 3116, the method 3100 may include a step of saving the permission.

Figure 32:
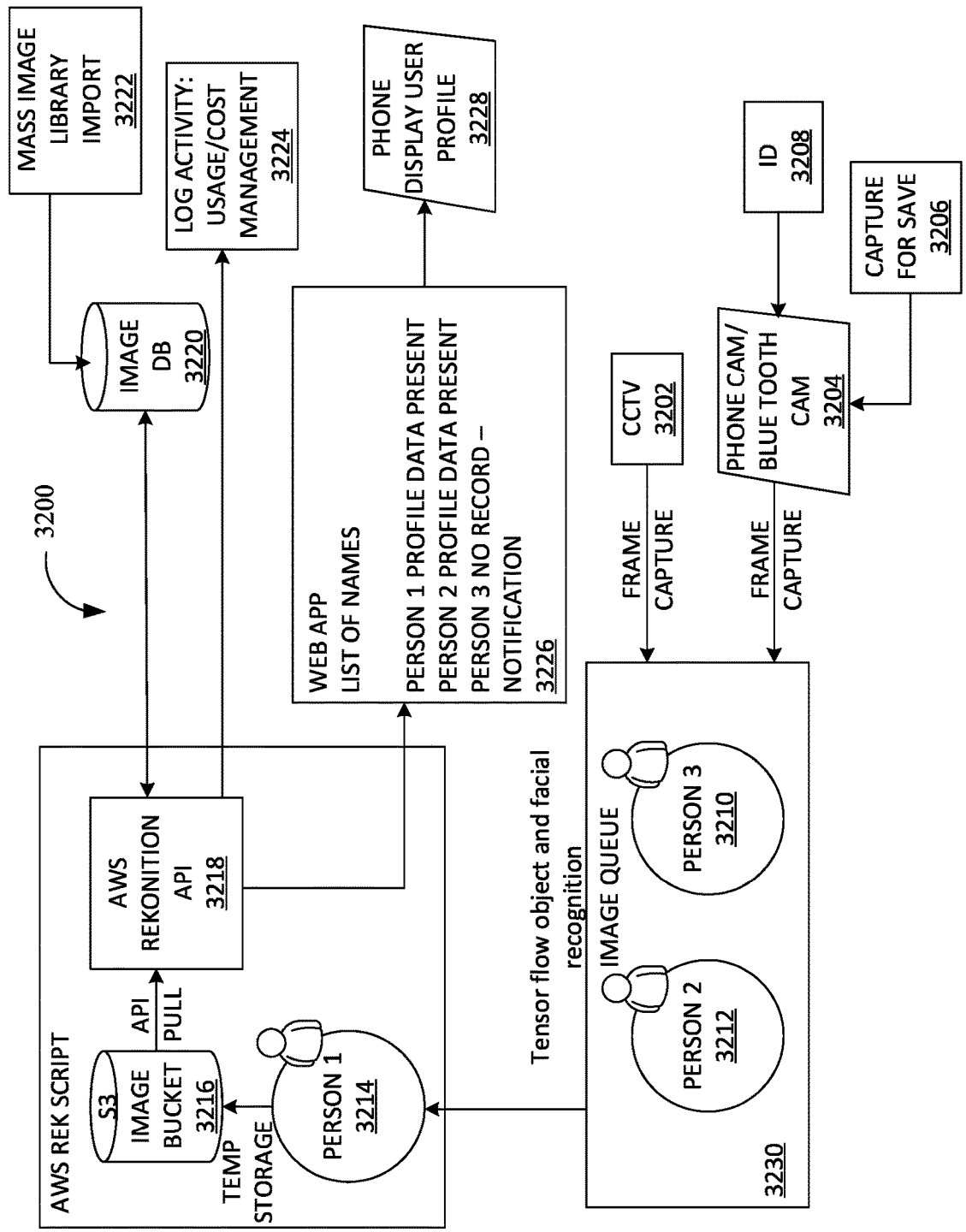
FIG. 32 is a flow diagram of a method to initiate a script associated with face recognition in order to verify if a user with the particular object may be an authorized user or not, in accordance with some embodiments.

FIG. 32 is a flow diagram of a method 3200 to initiate a script associated with face recognition in order to verify if a user with the particular object may be an authorized user or not, in accordance with some embodiments. Further, the method 3200 may be configured to identify a particular object (such as a gun and/or a weapon). Further, at 3202, the method 3200 may include a step of capturing frame by a CCTV. Further, at 3204, the method 3200 may include a step of capturing frame by a phone Cam or Bluetooth Cam. Further, at 3206, the method 3200 may include a step of saving the captured frame. Further, the phone Cam or Bluetooth Cam may be associated with an ID at 3208. Further, at 3230, the method 3200 may include a step of performing tensor flow of object and facial recognition. Further, the method 3200 may include a step of image queuing of person 2 at 3212 and person 3 at 3210. Further, the method 3200 may include a step of initiating an AWS REK script which may include a person 1 at 3214. Further, at 3216, data of the person 1 may be stored in the temporary storage S3 image bucket. Further, at 3218, the method 3200 may include a step of pulling API (AWS recognition API). Further, at 3220, the method 3200 may include a step of matching the data with image database. Further, at 3222, the image database may include mass image library import. Further, at 3224, the API may include log activity such as usage/cost management. Further, at 3226, the method 3200 may include a step of transmitting the data of each person to a web application. Further, the web application may include a list of names. Further, the web application, in an instance, may include profile data of person 1 and person 2. Further, the web application, in an instance, may not include a record of person 3. Further, at 3228, the method 3200 may include a step of transmitting a notification to phone display associated with a user profile.

Figure 33:
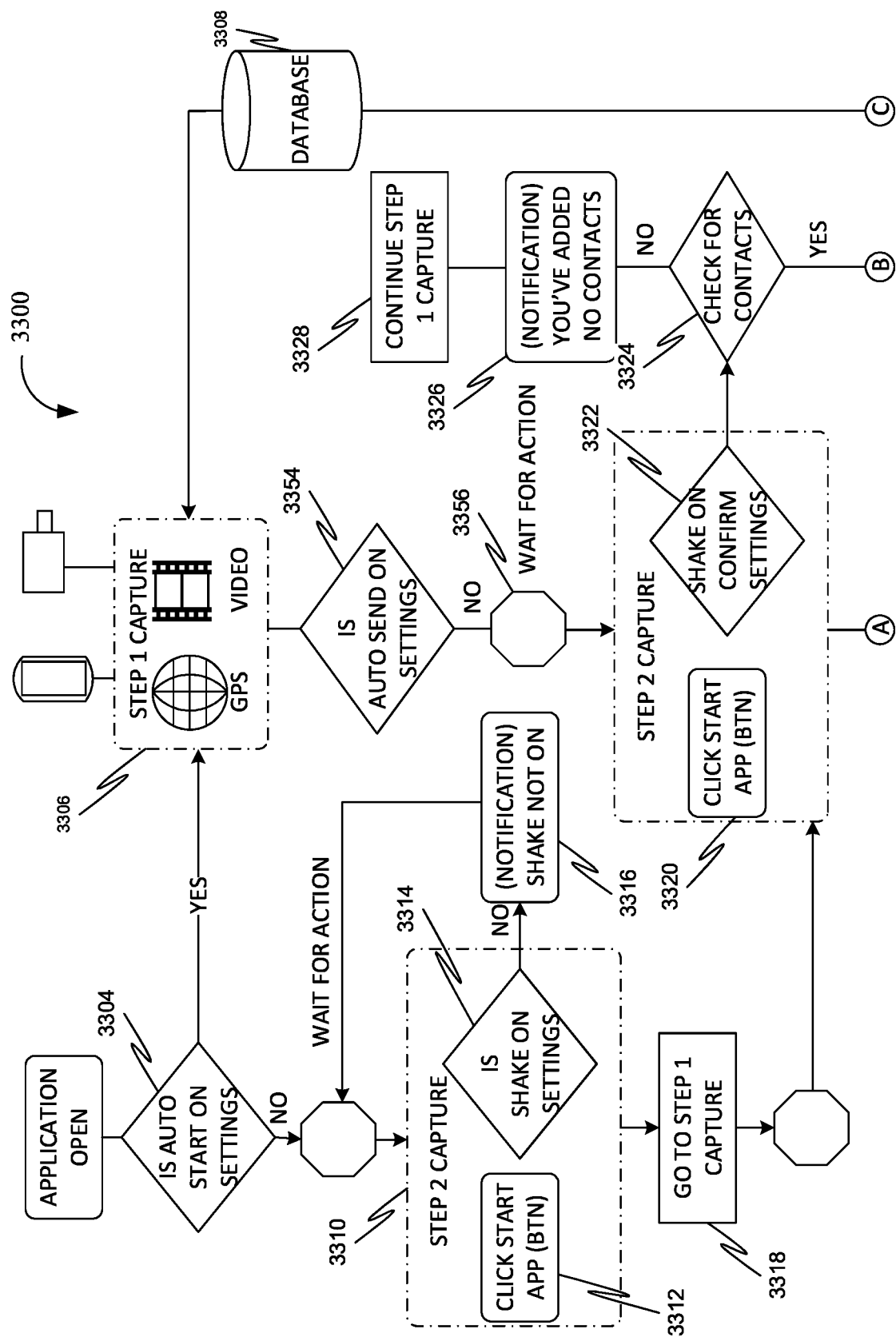
FIG. 33 is a flow diagram of a method to facilitate communication between the supervised user device and the supervisor device based on geofencing, in accordance with some embodiments.

FIG. 33 is a flow diagram of a method 3300 to facilitate communication between the supervised user device and the supervisor device based on geofencing, in accordance with some embodiments. Further, at 3302, the method 3300 may include a step of opening an application. Further, at 3304, the method 3300 may include a step of determining if auto start on settings on or off. Further, if yes (on), at 3306, the method 3300 may include a step of capturing a video by a CCTV or mobile device. Further, the CCTV or mobile device may be associated with GPS location. Further, at 3308, the method 3300 may include a step of storing the video in a database. Further, at 3310, if no (off), the method 3300 may include a step of capturing a video. Further, at 3312, a user may click the start app (BTN). Further, at 3314, the method 3300 may include a step of determining if "shake on" setting is on or off. Further, if no, at 3316, the method 3300 may include a step of providing notification that shake is not on. Further, at 3318, the method 3300 may include a step of going to step 1. Further, at 3320, the user may click the send app (BTN). Further, at 3322, the method 3300 may include a step of determining if shake on confirmed. Further, at 3324, the method 3300 may include a step of checking for contacts. Further, at 3326, the method 3300 may include a step of providing a notification that no contacts may be added. Further, at 3328, the method 3300 may include a step of continuing to step 1. Further, at 3330, the method 3300 may include a step of transmitting the contacts to the mobile device. Further, at 3332, the method 3300 may include a step of determining a pro code user. Further, at 3334, if no pro code user is determined the method 3300 may include a step of retrieving data from geofence database. Further, at 3336, the method 3300 may include a step of checking geofencing database for the owner. Further, at 3338, the method 3300 may include a step of providing a notification if no monitoring services are monitored in this location. Further, at 3340, the method 3300 may include a step of continuing to step 1. Further, at 3342, the method 3300 may include a step of determining is auto-route on in the setting. Further, at 3344, the method 3300 may include a step of requesting to send. Further, at 3346, the method 3300 may include a step of continuing to step 1. Further, at 3348, the method 3300 may include a step of dispatching incident data. Further, at 3350, the method 3300 may include a step of stopping the process by the user. Further, at 3352, the method 3300 may include a step of ending the process by pre-defined end reason. Further, at 3354, the method 3300 may include a step of determining if auto send on settings on or off. Further, at 3356, if no, the method 3300 may include a step of waiting for action and continuing to the step 2 of capturing.

Figure 34:
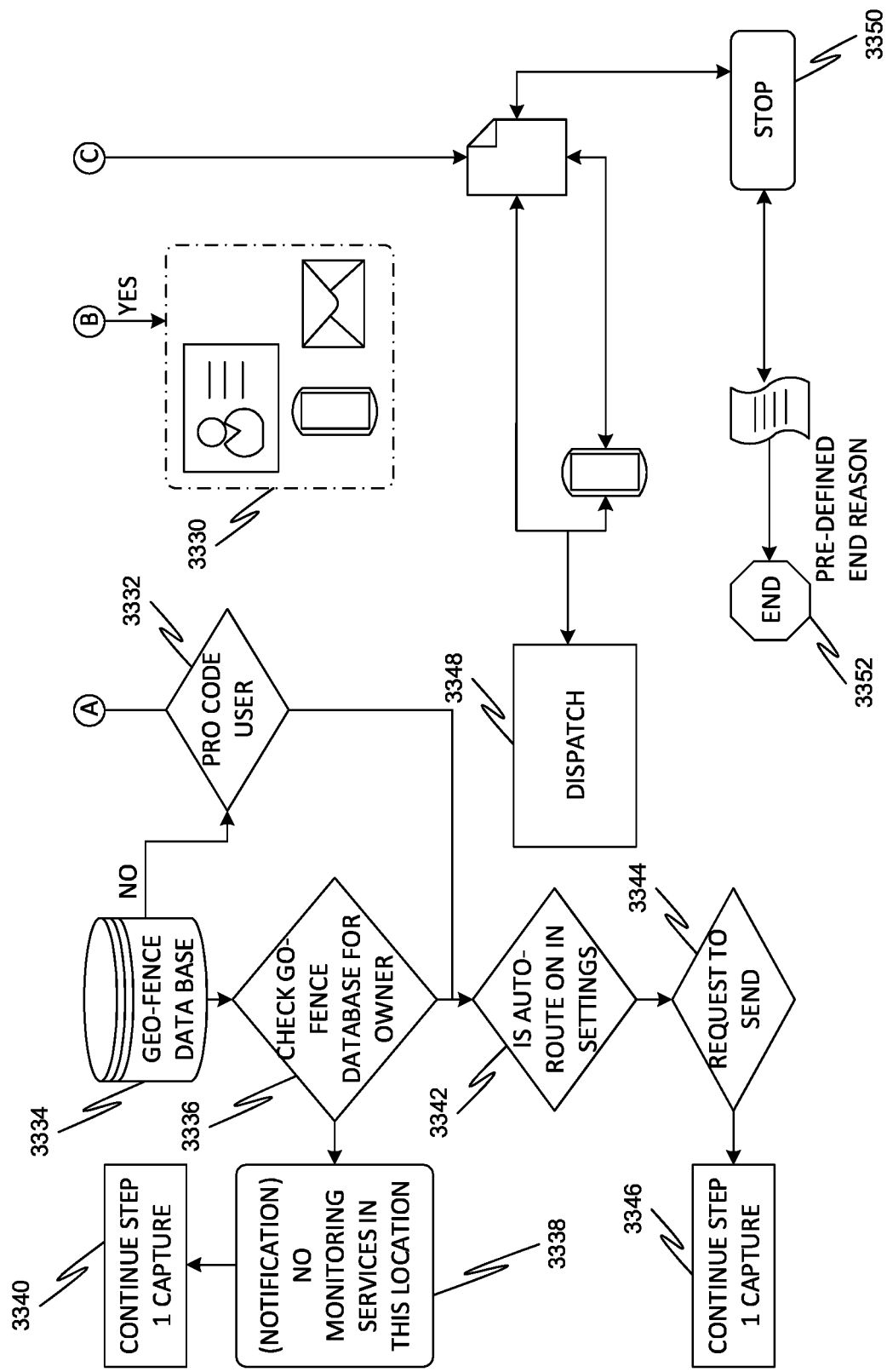
FIG. 34 is a continuation flow diagram of the method used for explaining processes carried out as shown in FIG. 33.

FIG. 34 is a continuation flow diagram of the method 3300 used for explaining processes carried out as shown in FIG. 33.

Figure 35:
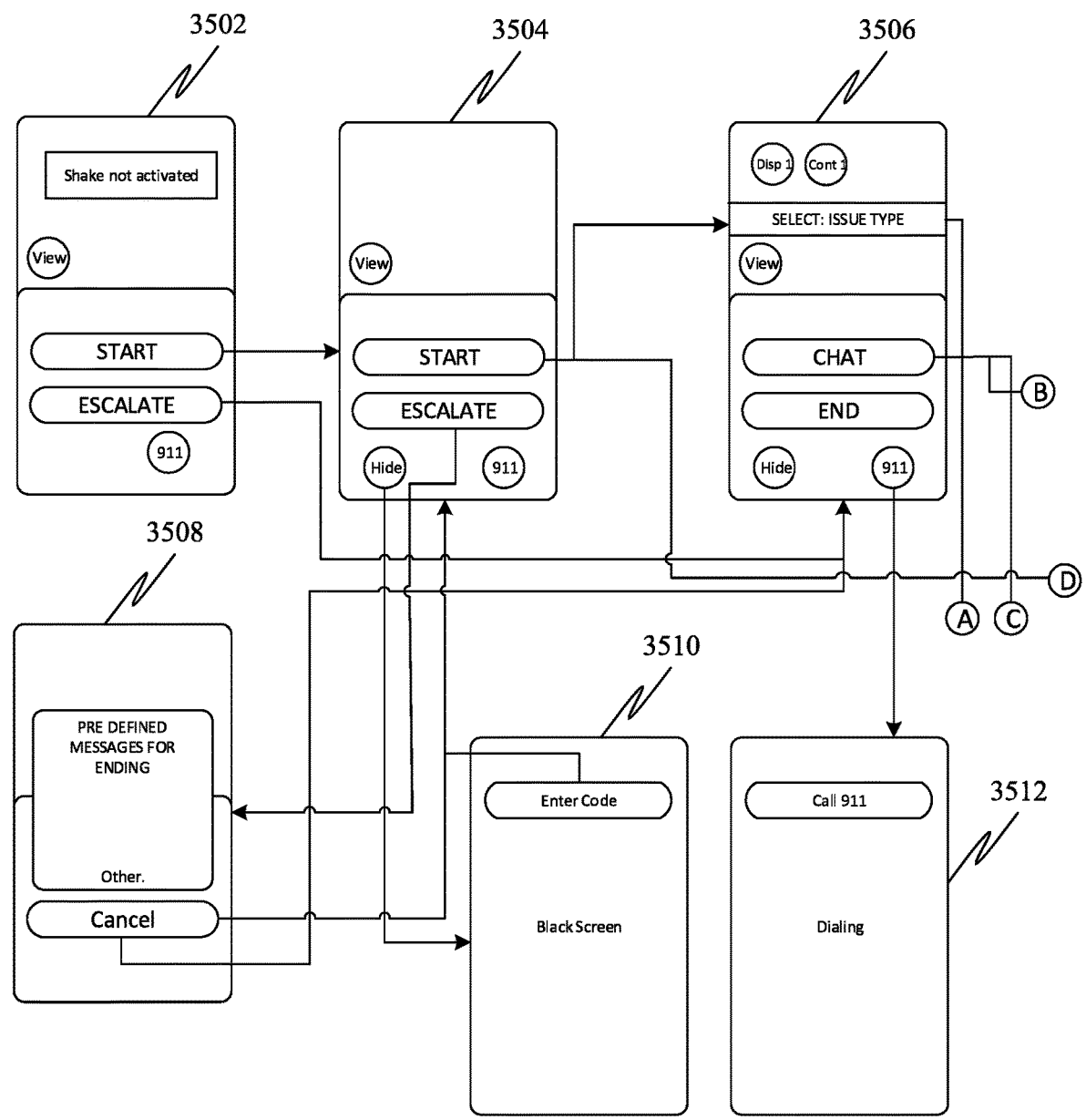
FIG. 35 is a flow diagram illustrating various navigation paths with respect to user interfaces available to facilitate triggering the emergency scenario, in accordance with some embodiments.
Figure 36:
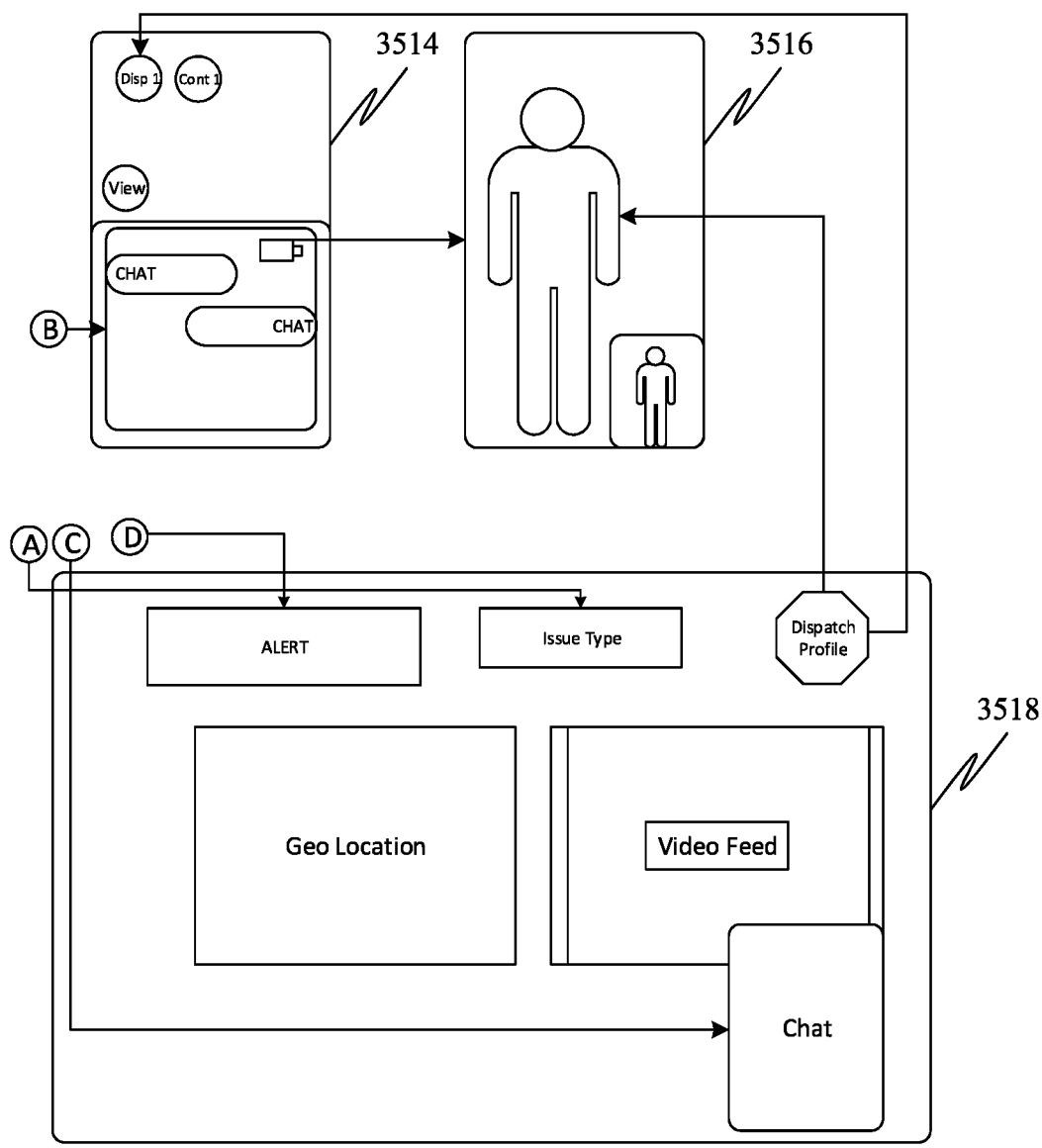
FIG. 36 is a continuation flow diagram of a method used for explaining processes carried out as shown in FIG. 35.

FIG. 35 is a flow diagram illustrating various navigation paths with respect to user interfaces available to facilitate triggering the emergency scenario, in accordance with some embodiments. Further, at 3502, if start is pressed, method may be followed by a user interface 3504. Further, if start is pressed on the user interface 3504, the method may be followed by a user interface 3518, as shown in FIG. 36. Further, if escalate is pressed on the user interface 3504, the method may be followed by a user interface 3508. Further, if chat is pressed on the user interface 3506, the method may follow a user interface 3514, as shown in FIG. 36. Further, if the video recorder is pressed on the user interface 3514, the method may be followed by a user interface 3516. Further, if hide is pressed on the user interface 3504, the method may be followed by a user interface 3510. Further, if 911 is pressed on the user interface 3506, the method may follow a user interface 3512. Further, if escalate is pressed on the user interface 3502, the method may be followed by a user interface 3518.

FIG. 36 is a continuation flow diagram of a method used for explaining processes carried out as shown in FIG. 35.

Figure 37:
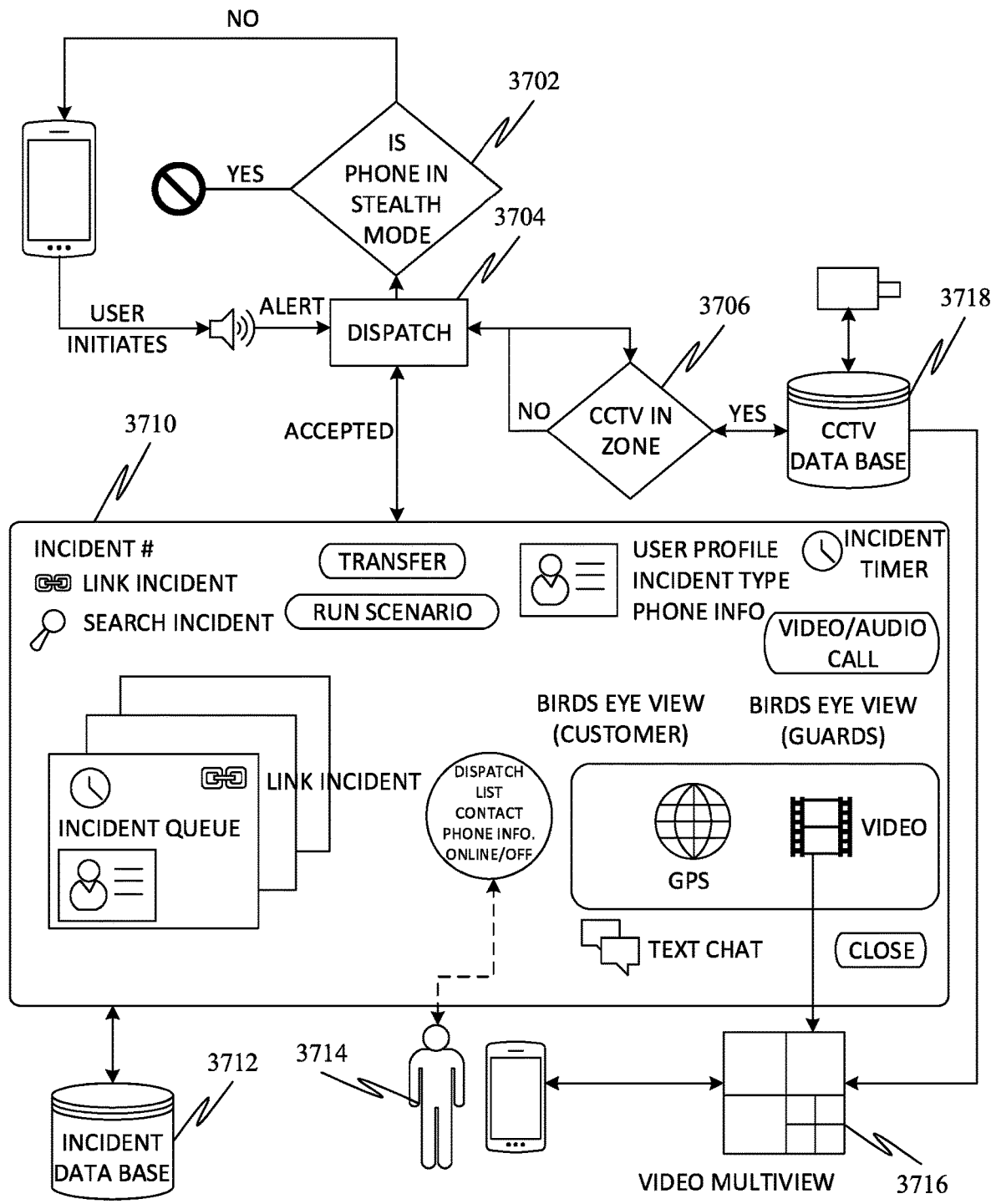
FIG. 37 is a flow diagram of a method to facilitate communication between the supervised user device and the supervisor device based on geofencing, in accordance with some embodiments.

FIG. 37 is a flow diagram of a method to facilitate communication between the supervised user device and the supervisor device based on geofencing, in accordance with some embodiments. Further, at 3702, the method may include a step of determining whether a phone is in stealth mode. Further, if no, the method may include a step of a user initiating an alert through a mobile device. Further, at 3704, the method may include dispatching. Further, if the dispatching is accepted, the method may include a step of transferring to step 3710. Further, at 3706, the method may include a step of determining whether CCTV is in a zone. Further, if yes, at 3718, the method may include a step of retrieving CCTV data from a database. Further, an emergency responder 3714 (one or many) may view video in multi-view 3716 using the mobile device. Further, the user may view dispatch list and contact (phone info) online/offline using the mobile device. Further, incident database 3712 may store/retrieve a data associated with the step 3710.

Figure 38:
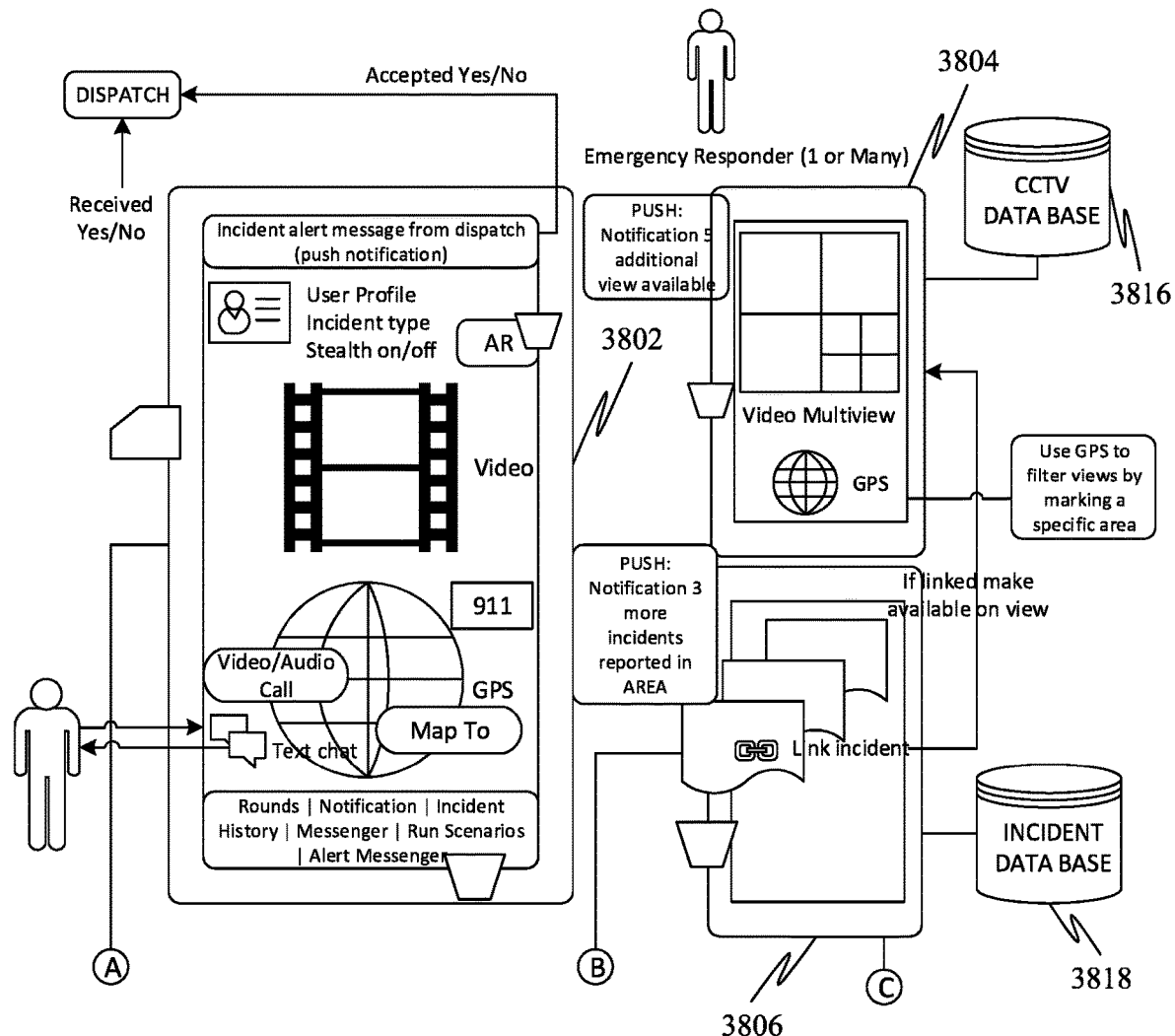
FIG. 38 is a flow diagram illustrating various navigation paths with respect to user interfaces available for a user device, in accordance with some embodiments.

FIG. 38 is a flow diagram illustrating various navigation paths with respect to user interfaces available for a user device, in accordance with some embodiments. Further, the user device, in an instance, may be a GPS enabled device configured to support augmented reality (AR) technology, and/or facial recognition. Further, a user interface 3802 may include a push notification displaying an incident alert message from dispatch. Further, the user interface may include a user profile, incident type, and stealth (on/off). Further, the user interface may display rounds, notifications, incident history, messenger, etc. Further, a user interface 3804 may include a video in multi-view that may be associated with a CCTV database 3816. Further, a user interface 3806 may be linked to incident database 3818. Further, a user interface 3808 may include user profiles of at least one user. Further, a user interface 3814 may include a user profile, incident type, and stealth (on/off). Further, a user interface 3812 may include a user profile with map with updated ETA. Further, a user interface 3810 may include a bird's eye view showing user profiles of users.

Figure 39:
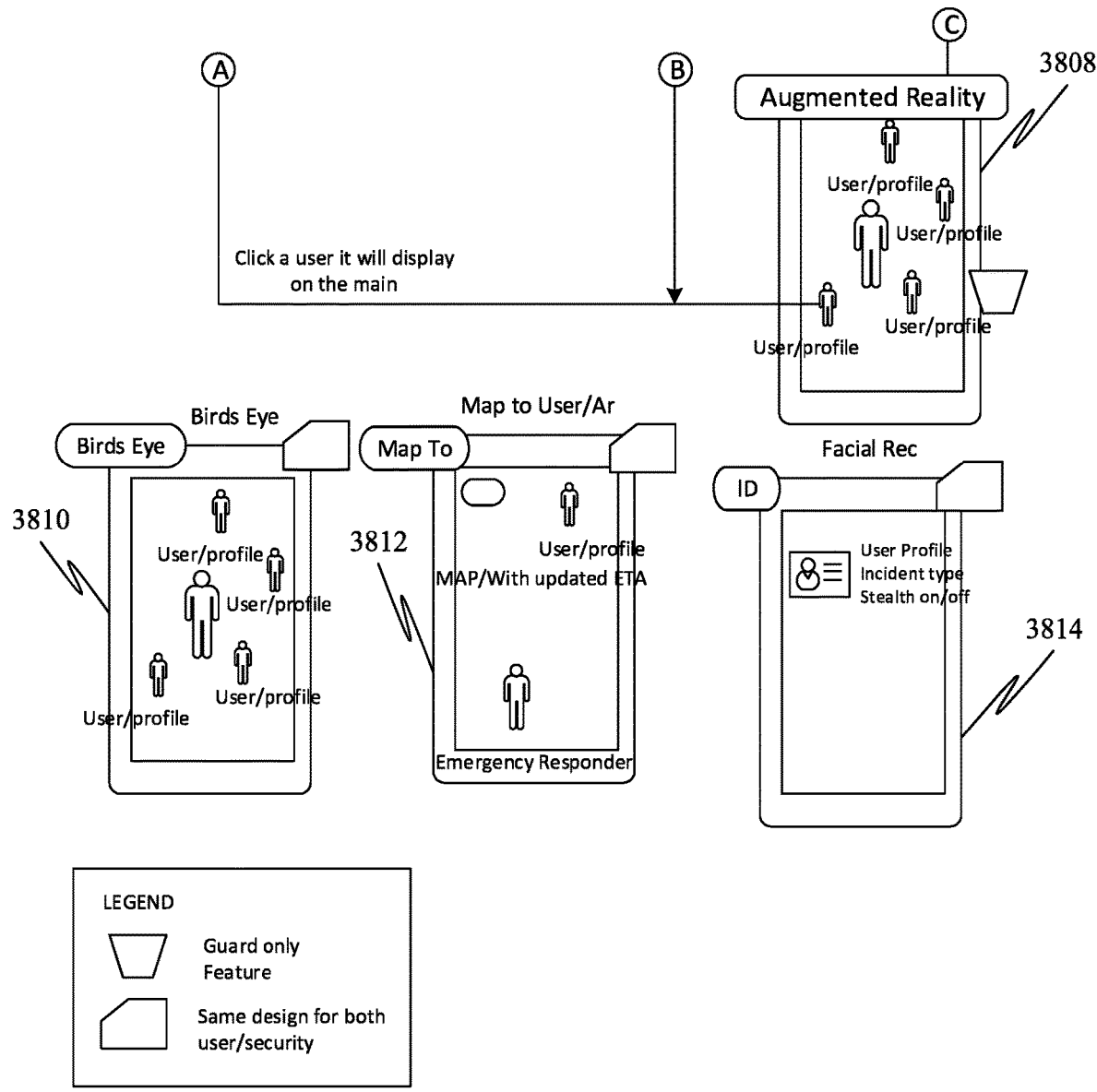
FIG. 39 is a continuation flow diagram of a method used for explaining processes carried out as shown in FIG. 38.

FIG. 39 is a continuation flow diagram of a method used for explaining processes carried out as shown in FIG. 38.

Figure 40:
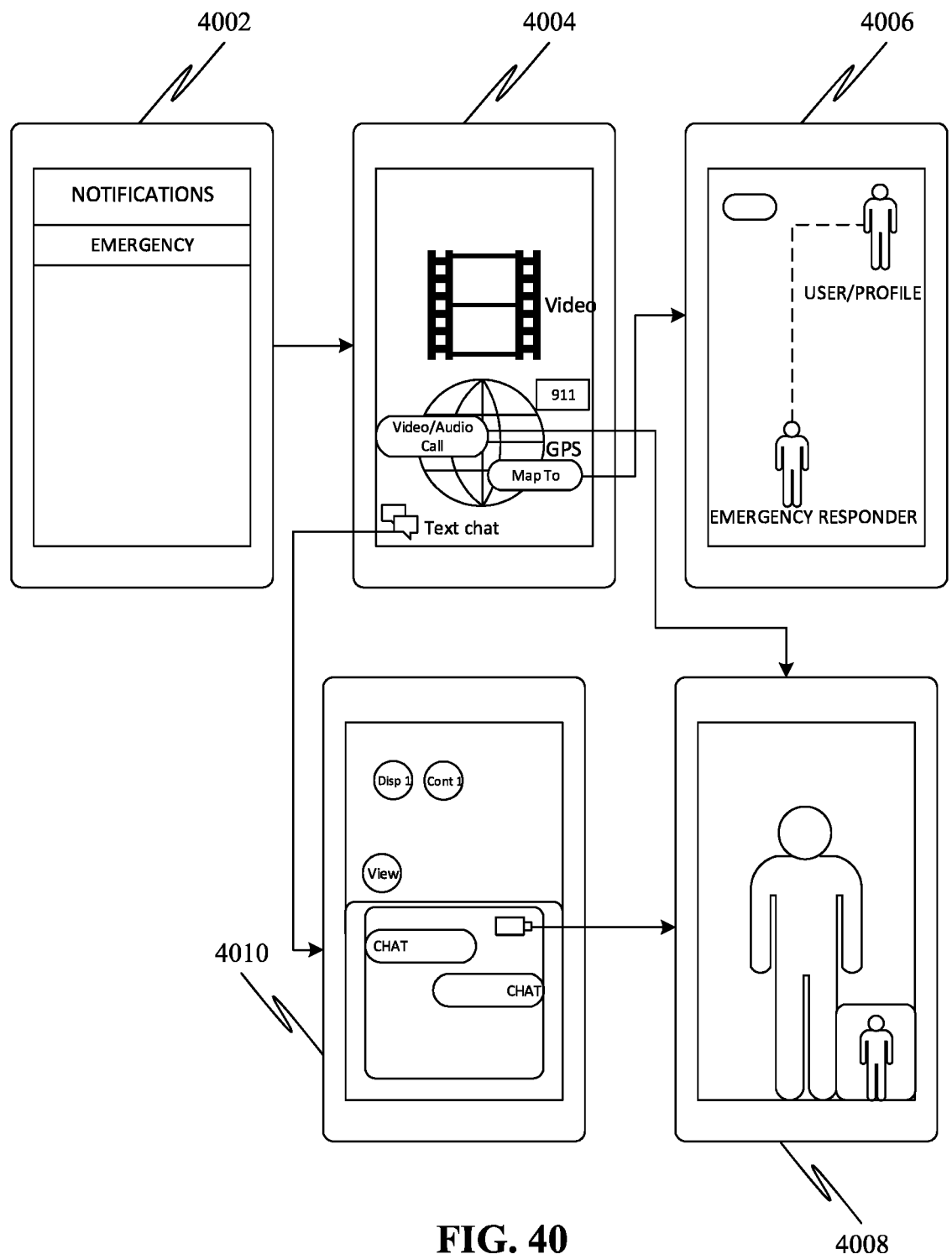
FIG. 40 is a flow diagram illustrating various navigation paths with respect to user interfaces available to trigger the emergency scenario, in accordance with some embodiments.

FIG. 40 is a flow diagram illustrating various navigation paths with respect to user interfaces available to trigger the emergency scenario, in accordance with some embodiments. Further, the user interface, in an instance, may allow the user to chat with one or more supervisors and/or emergency services in real-time. Further, the user may be allowed to video-call with the one or more supervisors and/or emergency services in real-time. Further, a user interface 4002 may display emergency notifications. Further, at 4004, user interface may display video. Further, a user interface 4006 may display a user profile on a map with updated ETA from an emergency responder. Further, a user interface 4008 may display users. Further, a user interface 4010 may display chat buttons that may facilitate in chatting with a user.

Figure 41:
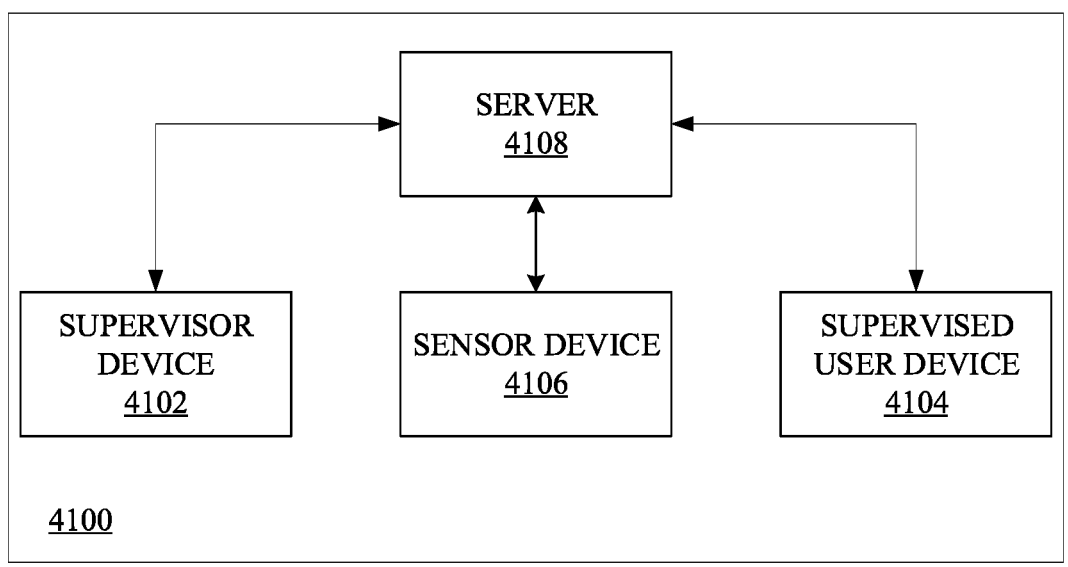
FIG. 41 is a block diagram of a system to facilitate communication between a supervisor device and a supervised user device based on geofencing, in accordance with some embodiments.

FIG. 41 is a block diagram of a system 4100 to facilitate communication between a supervisor device 4102 and a supervised user device 4104 based on geofencing, in accordance with some embodiments. Accordingly, the system 4100, in an instance, may include (but not limited to) a supervisor device 4102, a supervised user device 4104, a sensor device 4106, a server 4108, etc. Further, the supervisor device 4102, in an instance, may be any GPS enabled device that may be operated by a supervisor. Further, the supervisor, in an instance, may be any individual and/or organization that may wish to supervise other users (such as children). For instance, the supervisor may include, but not limited to, parents, teachers, doctors, guardians, caretakers, cops, etc. Further, the supervisor device 4102, in an instance, may be an IoT based device that may be configured to communicate with the server 4108 through a wired and/or wireless communication medium such as, but not limited to, a Wi-Fi, a Bluetooth, an electromagnetic waveform, ultra-sound, cellular (5G) and/or an Infra-red, etc. Further, the supervisor device 4102, in an instance, may include devices such as (but not limited to) smartphones, smartwatches, laptops, PCs, etc.

Further, the supervised user device 4104, in an instance, may be a GPS enabled device which may be operated by a supervised user. Further, the supervised user, in an instance, may be an individual that may need to be supervised by the supervisor. For instance, the supervised user may include a child going to a school that may need to be supervised by the parents with regard to a location associated with the child. Further, in another instance, the supervised user may be a patient in a hospital that may need to be supervised by caretakers and/or doctors with regard to a location associated with the patient. Further, the supervised user device 4104, in an instance, may be configured to communicate with the server 4108 through a wired and/or wireless communication medium such as, but not limited to, a Wi-Fi, a Bluetooth, an electromagnetic waveform, ultra-sound, cellular (5G) and/or an Infra-red, etc. Further, the supervised user device 4104, in an instance, may include devices such as (but not limited to) smartphones, smartwatches, laptops, PCs, etc. Further, the supervised user device 4104, in an instance, may include one or more sensors that may be configured to capture sensory data associated with the supervised user. Further, the sensory data, in an instance, may include any data and/or information that may reflect something of interest about the supervised user. For instance, the sensory data may include a live location associated with the supervised user (such as a child). Further, in another instance, the sensory data may include multimedia content (such as, but not limited to, an image, a video, a live audiovisual content, etc.) associated with a surrounding of the supervised user. Further, the one or more sensors, in an instance, may include, but not limited to, location sensors (such as GPS), motion sensors, camera sensors, audio sensors (such as a microphone), proximity sensors, etc.

Further, the supervisor device 4102, in an instance, may allow the supervisor to map a facility and/or create a geofence within and/or around the facility. Further, the facility, in general, may be any space that may be associated with the supervised user. For instance, the facility may include, but not limited to, a school, a hospital, an office, a restaurant, a building, a road, a construction site, and/or a forest area, etc. Further, the geofence, in an instance, may be a set of boundaries within and/or around the facility that may be set by the supervisor in order to track entry and/or exit events of the supervised user into and/or from the geofence. For instance, the supervisor (such as parents) may be notified (through an alert which may be transmitted to the supervisor device 4102 by the server 4108) when the supervised user (such as a child) may enter and/or exit the geofence. Further, in another instance, the supervisor (such as parents) may be notified when the supervised user (such as a child) may be present in a location at a time instant when the child is not supposed to be present at that location. Further, the geofence, in an instance, may be any area within and/or around the facility that may require relatively higher surveillance. For instance, the geofence may include key places within the facility where relatively more number of incidents (such as, but not limited to, criminal activities)

have taken place in recent times. Further, the key place, in an instance, may include locations such as, but not limited to, a corridor, a room, an open ground, an intersection, a busy hallway, an alleyway, etc.

Further, the supervisor, in an instance, may create the geofence by interacting with the supervisor device 4102. For instance, in one embodiment, the supervisor may provide (through a keyboard and/or a touch-screen panel associated with the supervisor device 4102) a name associated with the key place. Further, in another instance, the supervisor may provide (through a keyboard and/or a touch-screen panel associated with the supervisor device 4102) latitudinal, longitudinal, and/or altitude coordinates associated with the key place. Further, in another instance, the supervisor may drop a pin and/or select (through a trackpad and/or a touch-screen panel associated with the supervisor device 4102) a location on a map associated with the facility in order to create the geofence within and/or around the facility. Further, the supervisor, in an instance, may create more than one geofence by adding more locations (and/or adding multiple points, check-points, etc.) by interacting with the supervisor device 4102.

Further, in some embodiments, the supervisor device 4102, in an instance, may allow the supervisor to create the geofence based on a physical movement of the supervisor. For instance, the supervisor may allow the server 4108 to track a location associated with the physical movement of the supervisor device 4102 when the supervisor may provide a signal to the server 4108 to start tracking the location (such as by tapping on a "responder button" option that may be available on a user interface associated with the supervisor device 4102). Further, the server 4108, in an instance, may be configured to receive location data from the location sensors of the supervisor device 4102. Further, the server 4108, in an instance, may receive the location data until the supervisor may provide an indication signal to the server 4108 to stop tracking the location (such as by tapping on a "stop tracking" option that may be available on a user interface associated with the supervisor device 4102). Further, the server 4108, in an instance, may be configured to analyze the location data. Further, the server 4108, in an instance, may be configured to generate a geofence data based on the analyses of the location data. Further, the geofence data, in an instance, may be any data and/or information that may reflect a real-world location of the geofence in a digital form. Further, the geofence data, in an instance, may include information such as (but not limited to) name, coordinates, size (such as area), etc. associated with the geofence. Further, the server 4108, in an instance, may be configured to store the geofence data in a database (such as the database 4214).

Further, in some embodiments, the supervisor device 4102, in an instance, may allow the supervisor to create the geofence based on audio data. Further, the audio data, an instance, may be any audible phrase which may be said by the supervisor in order to create the geofence. For instance, the supervisor may provide an audible phrase such as "create a geofence for a location with relatively higher incidents in recent times." Further, the supervisor device 4102, in an instance, may be configured to sense the audio data through the audio sensor (such as the microphone) that may be embedded within the supervisor device 4102. Further, the supervisor device 4102, in an instance, may be configured to transmit the audio data to the server 4108. Further, the server 4108, in an instance, may be configured to analyze the audio signal. Further, the analyses, in an instance, may include audio analysis (e.g. speech recognition, speaker recognition, etc.). Further, the server 4108, in an instance, may be configured to determine the geofence based on the analyses by retrieving data from other databases. For instance, in order to determine locations with relatively higher incidents (and/or criminal activities) in recent times, the server 4108 may retrieve data from a database associated with multiple organizations (such as, but not limited to, police stations) that may be storing historical criminal activities.

Further, the system 4100, in an instance, may include the sensor device 4106 that may be disposed within and/or around the facility. The sensor device 4106, in an instance, may be devices that may be configured to collect sensor data associated with an incident that may take place in the vicinity of the facility. Further, the incident, in an instance, may be an event in which the supervised user may require assistance from the supervisor and/or from emergency services (such as police, medical services, fire services, news services, etc.). For instance, the incident may include (but not limited to) a criminal event, a police chase, etc. Further, the sensor data, in an instance, may include audio data, audiovisual data, textual data, location data, etc. Further, the sensor device 4106, in an instance, may include (but not limited to) a CCTV camera, a microphone, a motion detector, a face detecting setup, a biometric scanner, etc. Further, the sensor device 4106, in an instance, may be configured to communicate with the server 4108 through a wired and/or a wireless communication medium such as, but not limited to, a Wi-Fi, a Bluetooth, an electromagnetic waveform, ultrasound, cellular (5G) and/or an Infra-red, etc. Further, in some embodiments, the sensor device 4106, in an instance, may be embedded within an unmanned aerial vehicle (such as a drone). Further, the drone, in an instance, may be configured to be deployed to a location within and/or around the facility where the incident may be taking place. Further, the drone, in an instance, may be configured to monitor the incident (through the sensor device 4106 that may be embedded within the drone) and/or may be configured to transmit the sensor data to the server 4108.

Further, the server 4108, in an instance, may be configured to analyze the sensor data received from the sensor device 4106. Further, the analyses, in an instance, may include processes such as data extraction (e.g. numerical value extraction, format conversion, etc.), data analysis (e.g. statistical analysis, etc.), image analysis (e.g. OCR, object recognition, face recognition, etc.), audio analysis (e.g. speech recognition, speaker recognition, etc.) and so on. Further, the server 4108, in an instance, may be configured to trigger an emergency scenario based on the analyses of the sensor data. Further, the emergency scenario, in an instance, may be an event in which the supervised user may be able to communicate with one or more supervisors and/or emergency services. Further, in some embodiments, the emergency scenario may be triggered if the supervised user may click a button (such as a dispatch button) on the supervised user device 4104, and/or may shake the supervised user device 4104, etc. Further, the emergency scenario may be triggered if the supervised user (such as a child) may provide a certain audible phrase to the supervised user device 4104.

Figure 42:
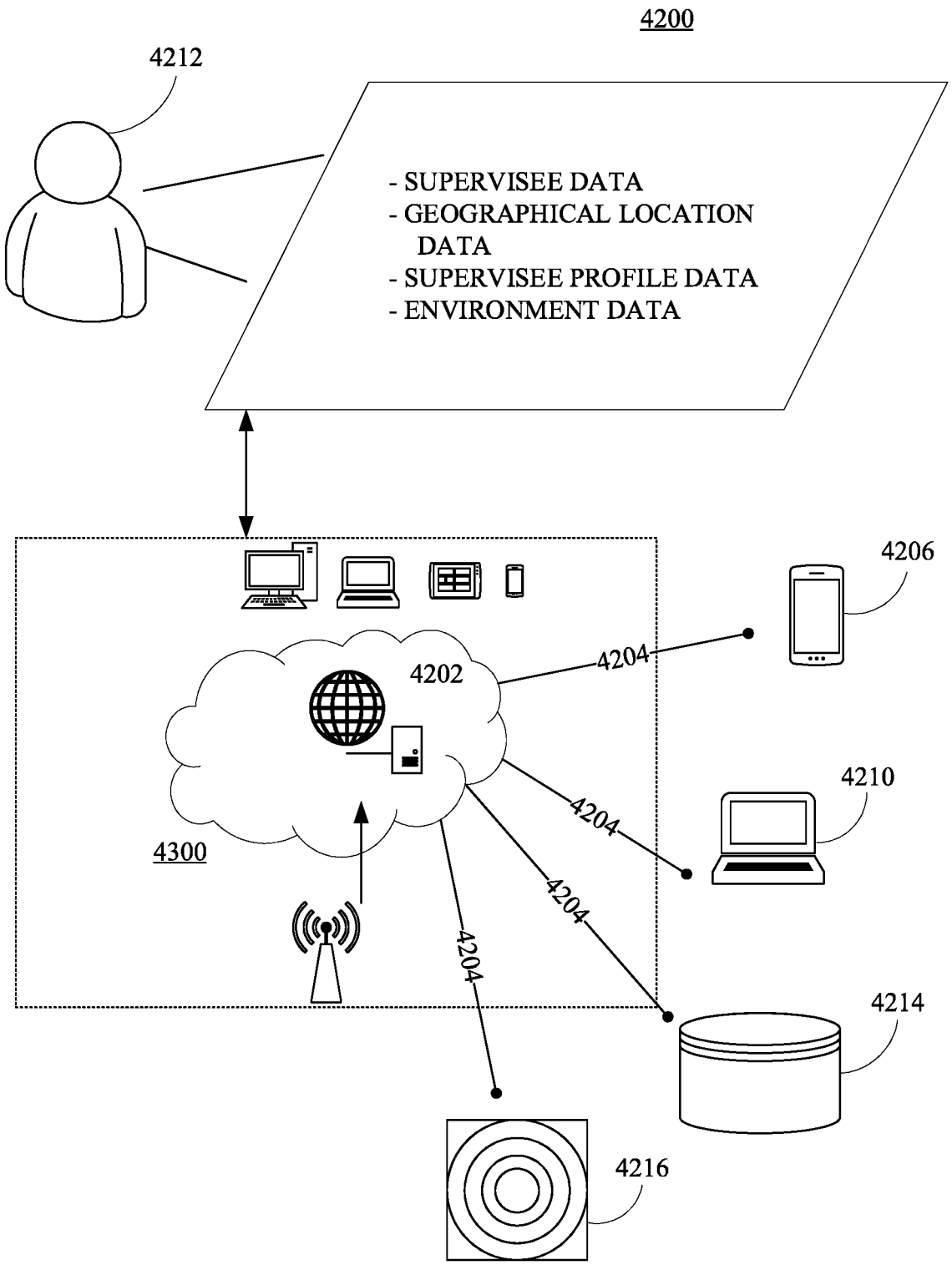
FIG. 42 is an illustration of an online platform consistent with various embodiments of the present disclosure.

FIG. 42 is an illustration of an online platform 4200 consistent with various embodiments of the present disclosure. By way of non-limiting example, the online platform 4200 to facilitate supervision of individuals based on geofencing may be hosted on a centralized server 4202, such as, for example, a cloud computing service. The centralized server 4202 may communicate with other network entities, such as, for example, a mobile device 4206 (such as a smartphone, a laptop, a tablet computer, etc.), other electronic devices 4210 (such as desktop computers, server computers, etc.), databases 4214, and sensors 4216 over a communication network 4204, such as, but not limited to, the Internet. Further, users of the online platform 4200 may include relevant parties such as, but not limited to, end-users, administrators, service providers, service consumers and so on. Accordingly, in some instances, electronic devices operated by the one or more relevant parties may be in communication with the platform.

A user 4212, such as the one or more relevant parties, may access online platform 4200 through a web-based software application or browser. The web-based software application may be embodied as, for example, but not be limited to, a website, a web application, a desktop application, and a mobile application compatible with a computing device 4300.

Figure 43:
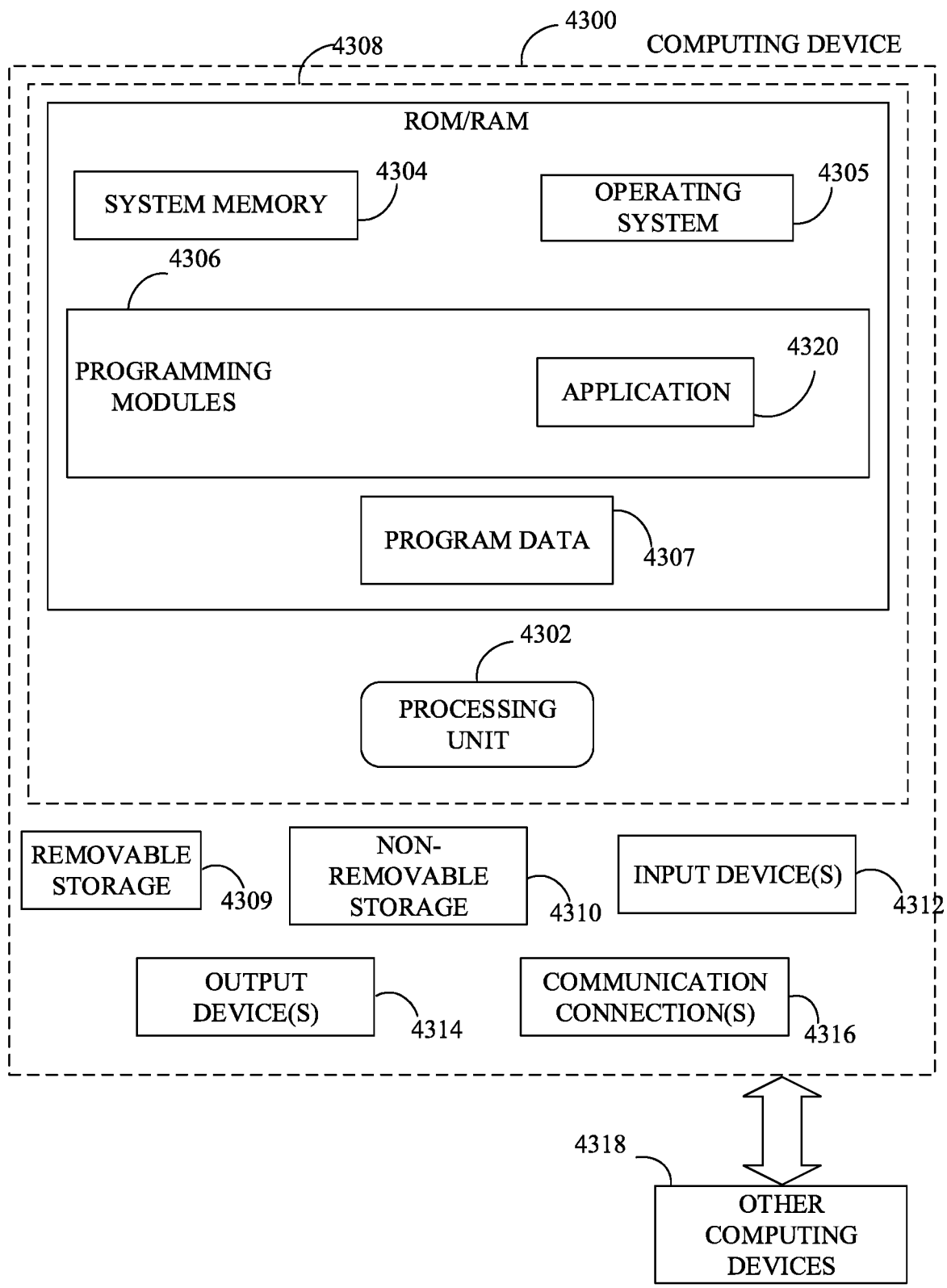
FIG. 43 is a block diagram of a computing device for implementing the methods disclosed herein, in accordance with some embodiments.

With reference to FIG. 43, a system consistent with an embodiment of the disclosure may include a computing device or cloud service, such as computing device 4300. In a basic configuration, computing device 4300 may include at least one processing unit 4302 and a system memory 4304. Depending on the configuration and type of computing device, system memory 4304 may comprise, but is not limited to, volatile (e.g. random-access memory (RAM)), non-volatile (e.g. read-only memory (ROM)), flash memory, or any combination. System memory 4304 may include operating system 4305, one or more programming modules 4306, and may include a program data 4307. Operating system 4305, for example, may be suitable for controlling computing device 4300's operation. In one embodiment, programming modules 4306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 43 by those components within a dashed line 4308.

The computing device 4300 may have additional features or functionality. For example, the computing device 4300 may also include additional data storage devices (removable and/or non-removable) such as, for example, magnetic disks, optical disks, or tape. Such additional storage is illustrated in FIG. 43 by a removable storage 4309 and a non-removable storage 4310. Computer storage media may include volatile and non-volatile, removable and non-removable media implemented in any method or technology for storage of information, such as computer-readable instructions, data structures, program modules, or other data. System memory 4304, removable storage 4309, and non-removable storage 4310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 4300. Any such computer storage media may be part of device 4300. Computing device 4300 may also have input device(s) 4312 such as a keyboard, a mouse, a pen, a sound input device, a touch input device, a location sensor, a camera, a biometric sensor, etc. Output device(s) 4314 such as a display, speakers, a printer, etc. may also be included. The aforementioned devices are examples and others may be used.

Computing device 4300 may also contain a communication connection 4316 that may allow device 4300 to communicate with other computing devices 4318, such as over a network in a distributed computing environment, for example, an intranet or the Internet. Communication connection 4316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 4304, including operating system 4305. While executing on processing unit 4302, programming modules 4306 (e.g., application 4320 such as a media player) may perform processes including, for example, one or more stages of methods, algorithms, systems, applications, servers, databases as described above. The aforementioned process is an example, and processing unit 4302 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may, in fact, be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for facilitating supervision of individuals based on geofencing, the method comprising:
receiving, using a communication device, at least one security parameter from at least one supervisor device associated with at least one supervisor;
receiving, using the communication device, a geographical location from the at least one supervisor device;
analyzing, using a processing device, the geographical location based on the at least one security parameter;
generating, using the processing device, a geofence corresponding to a geographical area based on the analyzing;
receiving, using the communication device, at least one supervisee data associated with a supervisee from at least one supervisee device;
analyzing, using the processing device, the at least one supervisee data based on the geofence;
generating, using the processing device, a supervision notification based on the analyzing of the at least one supervisee data;
transmitting, using the communication device, the supervision notification to the at least one supervisor device; and
storing, using a storage device, the at least one supervisee data and the supervision notification, wherein:
the geofence is characterized by a geofence area corresponding to the geographical area, wherein the geofence comprises a plurality of geofence grid boxes associated with the geofence area, wherein each geofence grid box is characterized by a grid box geofence area of the geofence area, wherein the method comprises:
receiving, using the communication device, at least one grid parameter from the at least one supervisor device, wherein the processing device is further configured for:
analyzing, using the processing device, the at least one grid parameter;
determining, using the processing device, the grid box geofence area based on the analyzing of the at least one grid parameter; and
generating, using the processing device, a number of geofence grid boxes based on the determining.

2. The method of claim 1 further comprising:
receiving, using the communication device, at least one location indication associated with the geographical area from the at least one supervisor device;
identifying, using the processing device, at least one location corresponding to the at least one location indication;
analyzing, using the processing device, the at least one supervisee data based on the at least one location; and
determining, using the processing device, a location anomaly based on the analyzing of the at least one supervisee data based on the at least one location, wherein the generating of the supervision notification is based on the determining.

3. The method of claim 1, wherein the supervision notification comprises at least one supervisee event, wherein the at least one supervisee event is associated with at least one action, wherein the method comprises:
determining, using the processing device, the at least one action based on the supervision notification; and
performing, using the processing device, the at least one action based on the determining, wherein the at least one action comprises an establishment of a communication session between the at least one supervisor device and the at least one supervisee device.

4. The method of claim 1 further comprising:
identifying, using the processing device, the supervisee based on the analyzing of the at least one supervisee data; and
retrieving, using the storage device, supervisee profile data associated with the supervisee based on the identifying, wherein the generating of the supervision notification is based on the retrieving.

5. The method of claim 1 further comprising:
identifying, using the processing device, at least one object associated with the supervisee based on the analyzing of the at least one supervisee data; and
determining, using the processing device, a lethality of the at least one object based on the identifying, wherein the generating of the supervision notification is based on the determining.

6. The method of claim 1 further comprising:
receiving, using the communication device, at least one environment data associated the geographical area corresponding to the geofence;
analyzing, using the processing device, the at least one environment data; and
determining, using the processing device, at least one threat based on the analyzing of the at least one environment data, wherein the generating of the supervisor notification is based on the determining.

7. The method of claim 1 further comprising:
retrieving, using the storage device, a blueprint associated with the geographical area corresponding to the geofence;
analyzing, using the processing device, the blueprint and the at least one supervisee data; and
determining, using the processing device, a location of the supervisee on the blueprint based on the analyzing of the blueprint and the at least one supervisee data, wherein the generating of the supervision data is based on the determining.

8. The method of claim 1, wherein the at least one supervisee device comprises at least one sensor, wherein the at least one sensor is configured for detecting at least one signal made by the supervisee, wherein the at least one sensor is configured for generating the at least one supervisee data based on the detecting.

9. The method of claim 1, wherein the supervisee is associated with at least one identification, wherein the method comprises:
receiving, using the communication device, at least one NFC indication corresponding to the at least NFC identification from the at least one supervisee device; wherein the receiving is performed over short range wireless communication comprising at least one of Bluetooth, Zigbee, Ultra-wideband, Wi-Fi and NFC, and
identifying, using the processing device, the supervisee based on the at least one NFC indication, wherein the generating of the supervision notification is based on the identifying.

10. A system for facilitating supervision of individuals based on geofencing, the system comprising:
a communication device configured for:
receiving, using a communication device, at least one security parameter from at least one supervisor device associated with at least one supervisor;
receiving, using the communication device, a geographical location from the at least one supervisor device;
receiving at least one supervisor data associated with a supervisee from at least one supervisee device; and
transmitting a supervision notification to the at least one supervisor device;
a processing device configured for:
analyzing the geographical location based on the at least one security parameter;
generating a geofence corresponding to a geographical area based on the analyzing;
analyzing the at least one supervisee data based on the geofence; and
generating the supervision notification based on the analyzing of the at least one supervisee data; and
a storage device configured for storing the at least one supervisee data and the supervision notification, wherein:
the geofence is characterized by a geofence area corresponding to the geographical area, wherein the geofence comprises a plurality of geofence grid boxes associated with the geofence area, wherein each geofence grid box is characterized by a grid box geofence area of the geofence area, wherein the communication device is further configured for receiving at least one grid parameter from the at least one supervisor device, wherein the processing device is further configured for:
analyzing the at least one grid parameter; determining the grid box geofence area based on the analyzing of the at least one grid parameter; and
generating a number of geofence grid boxes based on the determining.

11. The system of claim 10, wherein the communication device is further configured for receiving at least one location indication associated with the geographical area from the at least one supervisor device, wherein the processing device is further configured for:
identifying at least one location corresponding to the at least one location indication;
analyzing the at least one supervisee data based on the at least one location; and
determining a location anomaly based on the analyzing of the at least one supervisee data based on the at least one location, wherein the generating of the supervision notification is based on the determining.

12. The system of claim 10, wherein the supervision notification comprises at least one supervisee event, wherein the at least one supervisee event is associated with at least one action, wherein the processing device is further configured for:
determining the at least one action based on the supervision notification; and
performing the at least one action based on the determining, wherein the at least one action comprises an establishment of a communication session between the at least one supervisor device and the at least one supervisee device.

13. The system of claim 10, wherein the processing device is further configured for identifying the supervisee based on the analyzing of the at least one supervisee data, wherein the storage device is configured for retrieving supervisee profile data associated with the supervisee based on the identifying, wherein the generating of the supervision notification is based on the retrieving.

14. The system of claim 10, wherein the processing device is further configured for:
identifying at least one object associated with the supervisee based on the analyzing of the at least one supervisee data; and
determining a lethality of the at least one object based on the identifying, wherein the generating of the supervision notification is based on the determining.

15. The system of claim 10, wherein the communication device is further configured for receiving at least one environment data associated the geographical area corresponding to the geofence, wherein the processing device is further configured for:

analyzing the at least one environment data; and determining at least one threat based on the analyzing of the at least one environment data, wherein the generating of the supervisor notification is based on the determining.

16. The system of claim 10, wherein the storage device is further configured for retrieving a blueprint associated with the geographical area corresponding to the geofence, wherein the processing device is further configured for analyzing the blueprint and the at least one supervisee data; and determining a location of the supervisee on the blueprint based on the analyzing of the blueprint and the at least one supervisee data, wherein the generating of the supervision data is based on the determining.

17. The system of claim 10, wherein the at least one supervisee device comprises at least one sensor, wherein the at least one sensor is configured for detecting at least one signal made by the supervisee, wherein the at least one sensor is configured for generating the at least one supervisee data based on the detecting.

18. The system of claim 10, wherein the supervisee is associated with at least one near field communication (NFC) identification, wherein the communication device is further configured for receiving at least one NFC indication corresponding to the at least NFC identification from the at least one supervisee device, wherein the processing device is further configured for identifying the supervisee based on the at least one NFC indication, wherein the generating of the supervision notification is based on the identifying.

* * * * *